US012752749B2

(12) United States Patent
van Thiel

(10) Patent No.: US 12,752,749 B2
(45) Date of Patent: Oct. 6, 2026

(54) ELECTROPNEUMATIC ASSEMBLY INCLUDING INTEGRATED FAILURE SAFETY-VALVE ARRANGEMENT FOR MULTIPLE FAULT, ELECTRONICALLY CONTROLLABLE PNEUMATIC BRAKING SYSTEM, AND METHOD FOR OPERATING A BRAKING SYSTEM

(71) Applicant: ZF CV Systems Global GmbH, Bern (CH)

(72) Inventor: Julian van Thiel, Grossburgwedel (DE)

(73) Assignee: ZF CV Systems Global GmbH, Bern (CH)

( * ) Notice: Subject to any disclaimer, the term of this patent is extended or adjusted under 35 U.S.C. 154(b) by 348 days.

(21) Appl. No.: 18/508,953

(22) Filed: Nov. 14, 2023

(65) Prior Publication Data

US 2024/0083399 A1 Mar. 14, 2024

Related U.S. Application Data

(63) Continuation of application No. PCT/EP2022/062094, filed on May 5, 2022.

(30) Foreign Application Priority Data

May 18, 2021 (DE) ..................... 10 2021 112 831.5

(51) Int. Cl.
*B60T 7/20* (2006.01)
*B60T 13/26* (2006.01)
*B60T 13/68* (2006.01)

(52) U.S. Cl.
CPC .............. *B60T 7/20* (2013.01); *B60T 13/268* (2013.01); *B60T 13/683* (2013.01); *B60T 2270/402* (2013.01); *B60T 2270/414* (2013.01)

(58) Field of Classification Search
CPC ........ B60T 7/20; B60T 13/268; B60T 13/683; B60T 2270/402; B60T 2270/414; B60T 2270/403; B60T 17/221; B60T 13/662
See application file for complete search history.

(56) References Cited

U.S. PATENT DOCUMENTS 5,294,190 A * 3/1994 Feldmann ................ B60T 8/00 303/118.1
5,427,440 A * 6/1995 Ward ...................... B60T 13/66 303/3

(Continued)

FOREIGN PATENT DOCUMENTS

CN 111867901 A 10/2020
CN 111867905 A 10/2020

(Continued)

OTHER PUBLICATIONS

English translation DE102018108092 (Year: 2026).*

(Continued)

*Primary Examiner* — Robert A. Siconolfi
*Assistant Examiner* — James K Hsiao
(74) *Attorney, Agent, or Firm* — Walter Ottesen, P.A.

(57) ABSTRACT

An electropneumatic assembly is for an electronically controllable pneumatic braking system for a commercial vehicle. The electropneumatic assembly includes a reservoir port for receiving a reservoir pressure, at least one redundancy brake-pressure port for providing a redundancy brake pressure for a first axle and/or a trailer of the vehicle, a failure supply port for providing a failure supply pressure that is limited with respect to and lower than the reservoir pressure, and a failure safety-valve arrangement, which is connected to the failure supply port and the redundancy brake-pressure port, and which has a failure brake valve that is realized as a monostable valve and can be switched in the (Continued)

event of a fault in order, based on the failure supply pressure, to deliver the redundancy brake pressure at the redundancy brake-pressure port.

22 Claims, 6 Drawing Sheets

(56) References Cited

U.S. PATENT DOCUMENTS

| | | | | |
|---|---|---|---|---|
| 5,572,187 | A | 11/1996 | Williford | |
| 5,986,544 | A * | 11/1999 | Kaisers | B60T 13/683 280/504 |
| 6,626,505 | B2 * | 9/2003 | Frank | B60T 8/5081 303/118.1 |
| 6,644,758 | B1 * | 11/2003 | Stumpe | B60T 8/327 303/9.66 |
| 6,758,298 | B2 * | 7/2004 | Eberling | B60T 17/221 303/6.1 |
| 6,953,228 | B2 * | 10/2005 | Leske | B60T 15/043 303/50 |
| 8,783,791 | B2 * | 7/2014 | Eberling | B60T 13/683 303/14 |
| 9,327,694 | B2 * | 5/2016 | Klostermann | B60T 8/1708 |
| 11,511,716 | B2 * | 11/2022 | Ripley | B60T 13/683 |
| 11,565,681 | B2 * | 1/2023 | Dombek | B60T 17/043 |
| 11,584,345 | B2 * | 2/2023 | Brütt | B60T 8/1708 |
| 11,807,208 | B2 * | 11/2023 | Van Thiel | B60T 15/027 |
| 12,109,987 | B2 * | 10/2024 | van Thiel | B60T 13/385 |
| 12,162,447 | B2 * | 12/2024 | Schnittger | B60T 15/041 |
| 2005/0218719 | A1 * | 10/2005 | Hatipoglu | B60T 15/045 303/188 |
| 2006/0017317 | A1 * | 1/2006 | Howell | B60T 13/36 303/9.66 |
| 2009/0184568 | A1 | 7/2009 | Bensch et al. | |
| 2013/0320751 | A1 * | 12/2013 | Eberling | B60T 7/042 303/14 |
| 2015/0239441 | A1 * | 8/2015 | Klostermann | B60T 11/108 303/7 |
| 2017/0267221 | A1 | 9/2017 | Hecker et al. | |
| 2019/0152459 | A1 | 5/2019 | Dieckmann et al. | |
| 2019/0193705 | A1 | 6/2019 | Wulf | |
| 2019/0248346 | A1 | 8/2019 | Wulf | |
| 2019/0248350 | A1 | 8/2019 | Wulf | |
| 2019/0248351 | A1 | 8/2019 | Wulf | |
| 2020/0023820 | A1 | 1/2020 | Van Thiel | |
| 2020/0023827 | A1 | 1/2020 | Van Thiel | |
| 2020/0070795 | A1 | 3/2020 | Van Thiel | |
| 2020/0079341 | A1 * | 3/2020 | Van Thiel | B60T 8/1708 |
| 2020/0086843 | A1 * | 3/2020 | van Thiel | B60T 13/36 |
| 2020/0139952 | A1 * | 5/2020 | Van Thiel | B60T 13/385 |
| 2020/0148180 | A1 | 5/2020 | Van Thiel | |
| 2021/0001828 | A1 * | 1/2021 | Van Thiel | B60T 8/94 |
| 2021/0070272 | A1 | 3/2021 | Van Thiel | |
| 2021/0387604 | A1 * | 12/2021 | Van Thiel | B60T 15/20 |
| 2022/0089137 | A1 | 3/2022 | Michaelsen et al. | |
| 2022/0144232 | A1 | 5/2022 | Van Thiel | |
| 2022/0227342 | A1 * | 7/2022 | Klostermann | B60T 8/171 |
| 2022/0274573 | A1 | 9/2022 | Otremba et al. | |
| 2023/0256947 | A1 * | 8/2023 | van Thiel | B60T 8/885 303/14 |
| 2024/0083399 | A1 * | 3/2024 | van Thiel | B60T 13/662 |
| 2024/0198996 | A1 * | 6/2024 | van Thiel | B60T 8/327 |
| 2024/0246520 | A1 * | 7/2024 | van Thiel | B60T 13/683 |

FOREIGN PATENT DOCUMENTS

| | | | | |
|---|---|---|---|---|
| DE | 10 2014 013 756 | B3 | 2/2016 | |
| DE | 10 2016 005 318 | A1 | 11/2017 | |
| DE | 10 2016 010 461 | A1 | 3/2018 | |
| DE | 10 2016 010 462 | A1 | 3/2018 | |
| DE | 10 2016 010 463 | A1 | 3/2018 | |
| DE | 10 2016 010 464 | A1 | 3/2018 | |
| DE | 10 2017 002 716 | A1 | 9/2018 | |
| DE | 10 2017 002 718 | A1 | 9/2018 | |
| DE | 10 2017 002 719 | A1 | 9/2018 | |
| DE | 10 2017 002 721 | A1 | 9/2018 | |
| DE | 102018108092 | A1 * | 10/2019 | B60T 8/94 |
| DE | 10 2019 106 274 | A1 | 9/2020 | |
| DE | 10 2019 106 591 | A1 | 9/2020 | |
| DE | 10 2020 130 277 | A1 | 5/2021 | |
| GB | 1 344 358 | A | 1/1974 | |
| WO | 2014/094936 | A1 | 6/2014 | |

OTHER PUBLICATIONS

English translation and Written Opinion of the International Searching Authority dated Oct. 7, 2022 for international application PCT/EP2022/062094 on which this application is based.

English translation and International Preliminary Report on Patentability of The International Bureau of WIPO dated Oct. 7, 2022 for international application PCT/EP2022/062094 on which this application is based.

International Search Report of the European Patent Office dated Oct. 7, 2022 for international application PCT/EP2022/062094 on which this application is based.

English translation and Office Action of the Chinese National Intellectual Property Administration dated Mar. 18, 2026 for corresponding Chinese patent application No. 202280033781.7.

* cited by examiner

ELECTROPNEUMATIC ASSEMBLY INCLUDING INTEGRATED FAILURE SAFETY-VALVE ARRANGEMENT FOR MULTIPLE FAULT, ELECTRONICALLY CONTROLLABLE PNEUMATIC BRAKING SYSTEM, AND METHOD FOR OPERATING A BRAKING SYSTEM

CROSS-REFERENCE TO RELATED APPLICATIONS

This application is a continuation application of international patent application PCT/EP2022/062094, filed May 5, 2022, designating the United States and claiming priority from German application 10 2021 112 831.5, filed May 18, 2021, and the entire content of both applications is incorporated herein by reference.

TECHNICAL FIELD

The disclosure relates to an electropneumatic assembly for an electronically controllable pneumatic braking system for a vehicle, in particular a commercial vehicle, including a reservoir port for receiving a reservoir pressure from at least a first compressed-air reservoir and including at least a first redundancy brake-pressure port for providing a first redundancy brake pressure for a first axle of the vehicle and/or a trailer of the vehicle. The disclosure further relates to an electronically controllable pneumatic braking system for a vehicle, in particular a commercial vehicle, including such an electropneumatic assembly, as well as to a method for operating an electronically controllable pneumatic braking system.

BACKGROUND

In electronically controllable pneumatic braking systems used in semi-autonomous or autonomous vehicles (in particular levels of automation SAE level 2 to 5), fallback levels must be applied in the event of a fault in order to prevent the vehicle from becoming unsafe. In particular with higher levels of automation, a driver cannot intervene directly, or there is no driver present in the vehicle in the first place. For this case, it must be ensured that an unsafe state of the vehicle can be avoided even if severe single faults or dual faults occur, and that either a fail-operational state or a fail-safe state can be achieved.

A system that, in particular, is focused on high residual availability is known, for example, from DE 10 2014 013 756 B3. The latter discloses electrical equipment of a vehicle having an at least partially electrical braking and steering means, which includes: an electrical or electromechanical steering means, which is connected to a steering gear and includes an electronic steering control means and an electrical steering adjuster, and a service brake means. Proposed as a service brake means in DE 10 2014 013 756 B3 is an electropneumatic service brake means that includes an electropneumatic service-brake valve means, an electronic brake control means, electropneumatic modulators and pneumatic wheel brake actuators, the electronic brake control means controlling the electropneumatic modulators electrically in order to generate pneumatic brake pressures or brake control pressures for the pneumatic wheel brake actuators individually for each wheel, each axle or each side. The electropneumatic service-brake valve means has a service-brake actuating element and, additionally, within an electrical service-brake circuit, an electrical channel including an electrical brake-value transmitter that can be actuated by the service-brake actuating element. Also provided is an electronic evaluation means that receives the actuation signals and that inputs brake demand signals into the electronic brake control means in dependence on the actuation signals, and includes at least one pneumatic channel within at least one pneumatic service-brake circuit, in which at least one control piston of the service-brake valve means is loaded with a first actuation force as a result of actuation of the service-brake actuation element due to a driver brake demand, and the control piston, in response to this, allows pneumatic brake pressures, or brake control pressures, to be generated for the pneumatic wheel brake actuators. The electronic evaluation means of the electropneumatic service-brake valve means further includes electronic control means for generating a second actuating force, independently of a driver brake demand, that acts on the control piston in the same or opposite direction with respect to the first actuating force in the presence of a brake demand that is independent of the driver's wish. The electropneumatic service brake means is supplied by an electrical energy source that is independent of a second electrical energy source that supplies the electropneumatic service-brake valve means with electrical energy. This ensures that, as far as possible, at least one of the two systems functions at all times. The electrical or electropneumatic steering means in this case is supplied with energy from the second electrical energy source. This is intended to achieve a high level of residual availability. However, the system is complex and cannot easily be implemented in every commercial vehicle.

A system that provides electronically pneumatically controlled redundancy is disclosed in DE 10 2016 005 318 A1. The system disclosed there uses a bypass valve to forward control pressures, in case of the failure of a subsystem, in order thus to supply, at least pneumatically, the respective electrically failed circuit. This also increases the residual availability. Similar systems are disclosed in DE 10 2016 010 462 A1 and in DE 10 2016 010 464 A1.

Furthermore, DE 10 2016 010 463 A1 discloses a system and method in which pilot valves are operated electronically via a redundancy signal if a failure or defect is detected in the electronic operating of wheel brakes of the braking system. The system in this case seeks to prevent the wheels from locking.

Known from DE 10 2017 002 716, DE 10 2017 002 718, DE 10 2017 002 719 and DE 10 2017 002 721 are systems in which redundancy is in each case generated pneumatically. In this case, different actuated brake pressures, for example front axle, rear axle or trailer brake pressures, are used to provide these failed systems such as, for example, the front-axle brake circuit, rear-axle brake circuit, parking brake circuit or trailer brake circuit, as redundancy pressure. In this way, a subordinate pneumatic redundancy level is created, such that, again, a high degree of residual availability is achieved.

In addition, there are also systems that include the trailer, such as disclosed, for example, in DE 10 2016 010 461 A1.

Also known, from DE 10 2019 106 274 A1, is an electronically controllable braking system that has two fallback levels. The electronically controllable braking system of the embodiment disclosed there includes a service braking system having a front-axle brake circuit, which has a front-axle modulator, as well as a rear-axle brake circuit and a central control module. The central control module in this case also acts as a rear-axle modulator and directly controls rear-axle brake pressures on at least one rear axle of the commercial vehicle. The central control module also provides signals to the front-axle modulator to cause it to deliver corresponding front-axle service-brake pressures on the front axle. The braking system also includes a parking brake circuit having parking brake module configured to process a brake command in the event of a defect in the central control module and to deliver a rear-axle redundancy brake pressure at spring accumulator parts on the rear axle for the purpose of redundant implementation of the brake command. In this first redundancy level, the front axle is operated pneumatically via a redundancy brake pressure, which is delivered by the parking brake module. This pneumatic control pressure is then implemented at the front axle modulator in order thus to allow front-axle brake pressures to be delivered on the front axle. The redundancy pressure is fed into a pressure path, into which a pneumatic brake-value transmitter (foot-brake pedal) can also feed pneumatic brake pressure. In the event of the parking brake module also now having a defect, it is defined as a second fallback level that the front-axle modulator can implement the brake command and accordingly provides a redundancy pressure at the parking brake module in order thus to enable pneumatic implementation of the redundancy pressure at the rear axle. The braking system disclosed here thus has an operating level as well as a first and a second fallback level. The purpose of this is to enable fail-operational functioning.

Another system is known from DE 10 2019 106 591 A1. The system disclosed there also has two fallback levels. The braking system disclosed there includes a further doubling of the elements and in particular also has, in addition to a front-axle modulator, a redundancy front-axle modulator that is active in the fallback level, and a redundancy rear-axle modulator that is active in the fallback level. These are controlled by a redundancy-braking control module, which may partly or fully replace the service-braking control module. A further fallback level can then in turn be reached via the parking brake. Such a system enables extensive fail-operational functioning, but uses a multiplicity of components and therefore requires more assembling and more space.

In addition to such systems having two functional fallback levels that allow fail-operational functioning in both a first and a second fallback level, there is also a requirement for systems that, in addition to a first fallback level, only allow fail-safe operation in a second (or further) fallback level, thus enabling unbraked coasting in the event of a dual fault in which both a service braking system and a redundancy braking system do not function or do not function properly.

SUMMARY

It is therefore an object of the present disclosure to provide an electropneumatic assembly, of the type stated at the outset, that enables safe braking and stopping of the vehicle, in a manner that is optimized in respect of cost and structural space, even if redundant systems, sub-systems or levels of the braking system have failed. If, for example, a braking system is supplied via several voltage sources, it can happen in the worst case that all voltage sources fail. In this case, too, the aim is to ensure that the vehicle can be safely decelerated in a simple manner.

The disclosure achieves the object, in the case of an electropneumatic assembly of the type stated at the outset, in that the assembly has a failure supply port for receiving a failure supply pressure that is limited with respect to and lower than the reservoir pressure, and by a failure safety-valve arrangement, which is connected to the failure supply port and the redundancy brake-pressure port, or at least to a first redundancy control port, and which has at least a first failure brake valve that is realized as a monostable valve and can be switched in the event of a fault in order, based on the failure supply pressure, to deliver the first redundancy brake pressure at the first redundancy brake-pressure port or at least a first redundancy control pressure at the first redundancy control port. The disclosure is based on the knowledge that safe braking and stopping of the vehicle can be achieved by use of a failure supply pressure that is limited with respect to and less than the reservoir pressure in order to directly or indirectly deliver a redundancy brake pressure at the first redundancy brake-pressure port. A permanent pressure is therefore present at the failure supply port, in particular a pressure that is available when the vehicle is moving, or in a moving vehicle state. The failure supply pressure may preferably originate from the first compressed-air reservoir, a further compressed-air reservoir of the electronically controllable pneumatic braking system or from a spring-brake cylinder present on one or more axles.

On the one hand, the failure safety-valve arrangement may be directly connected to the redundancy port, if necessary with the interposition of one or more valves, such that the pressure delivered by the failure safety-valve arrangement is provided, as a first redundancy brake pressure, at the first redundancy brake-pressure port. Alternatively, however, the failure safety-valve arrangement may also provide only a first redundancy control pressure, which is then delivered at a further, preferably volume-boosting, valve such as, for example, a relay valve or pneumatically switchable valve. In this case, the first redundancy control pressure then causes the first redundancy brake pressure to be delivered by the further valve, such as, for example, the relay valve.

In one embodiment, however, the failure safety-valve arrangement may also include such a volume-boosting valve, preferably a relay valve.

The electropneumatic assembly may be an electropneumatic module of the electronically controllable pneumatic braking system that is present in any case, such as, for example, a central module of the operating level and/or redundancy level, a front and/or rear-axle modulator, a parking brake modulator or a trailer control valve. However, the electropneumatic assembly may also be a part of such a modulator or be partly or fully integrated with it. In this case, in order to realize the electropneumatic assembly according to the present disclosure, it may be sufficient to provide an existing electropneumatic module with a failure supply port and a failure safety-valve arrangement. The reservoir port supplies the electropneumatic assembly with reservoir pressure to deliver pressures in the case of operation and/or a first fallback level. The failure supply pressure provided at the failure supply port is then preferably only used in a second or further fallback level in order then, in this fallback level, to deliver the redundancy brake pressure at the first redundancy brake-pressure port and thus brake the vehicle. It may be provided that, in the first fallback level of the electronically controllable pneumatic braking system, a redundancy pressure is delivered at the redundancy brake-pressure port, this pressure being delivered by use of the reservoir pressure received from the reservoir port.

In an embodiment, it is provided that the first failure brake valve is a 3/2-way valve having a first failure brake-valve port receiving the failure supply pressure, a second failure brake-valve port delivering the first redundancy brake pressure or an associated redundancy control pressure, and a third failure brake-valve port connected to a vent, wherein in a non-activated switch position the first failure brake-valve port is connected to the second failure brake-valve port, and in an activated switch position the second failure brake-valve port is connected to the third failure brake-valve port. The first failure brake-valve port may be connected to the failure supply port, or there may be one or more additional valves arranged between it and the failure supply port. The second failure brake-valve port is preferably directly or indirectly connected to the first redundancy brake-pressure port. The pressure delivered by the second failure brake-valve port may be provided directly as redundancy brake pressure or initially as redundancy control pressure, which is then volume-boosted by a further valve unit and delivered at the redundancy brake-pressure port. The third failure brake-valve port is connected to a vent, which in particular is a central vent of the electropneumatic assembly, or of the electropneumatic module of which the electropneumatic assembly is a part. As long as the first failure brake valve is energized, the second failure brake-valve port is connected to the third failure brake-valve port, such that the second failure brake-valve port is always vented and thus no pressure is delivered at it. It is only when the first failure brake valve is switched to a non-activated state because it is no longer being energized, for example because a fault has occurred in a control unit operating it, that the first failure brake-valve port is connected to the second failure brake-valve port, such that the failure supply pressure can be passed through and is delivered as redundancy pressure or redundancy control pressure.

It is preferably provided that there is a pressure limiter upstream of the failure supply port, or the electropneumatic assembly has a pressure limiter for limiting the pressure received at the failure supply port. The failure supply pressure is to be limited and lower than the reservoir pressure. For example, the reservoir pressure in typical braking systems may be between 8 bar and 12 bar. The failure supply pressure can preferably be limited to a range of between about 2 bar and 8 bar. The exact limitation of the failure supply pressure may be dependent on particular permitted friction values, for example the vehicle weight, the type of brake actuators or the load state of the vehicle. The axle load may also be a factor. Since the failure supply pressure is used directly to deliver the redundancy brake pressure, it should be limited such that direct locking of one or more axles of the vehicle is prevented. Nevertheless, it should be sufficiently high to allow safe braking. For example, it is conceivable for a higher failure supply pressure to be allowed at a low vehicle speed, since at low speeds locking of one or more axles will not directly result in vehicle instability. At a higher speed, however, the failure supply pressure could be limited further, in order to safely prevent locking of one or more axles. The pressure limiter serves exactly this purpose. However, a pressure limiter may also be omitted if the source from which the failure supply pressure originates is already pressure-limited. For example, if the failure supply pressure is provided from a spring-brake cylinder, the pressure may already be limited. This is the case, for example, if a spring-brake cylinder pressure is limited to about 8 bar, but the reservoir pressure of the braking system is 12 bar. In this case, it may be advantageous not to provide an additional pressure limiter.

The integration of the pressure limiter into the electropneumatic assembly is advantageous in that the amount of assembly work can be reduced. However, it may also be advantageous to provide the pressure limiter in close proximity to the pressure source from which the failure supply pressure is provided. This means that pipework can be simpler.

In an embodiment, it is provided that the failure safety-valve arrangement has an electromagnetic bistable valve that is pneumatically connected in series to the first failure brake valve. Such a bistable valve is an electromagnetic solenoid valve having at least one first permanent magnet. The permanent magnet holds the bistable valve in a detent position even in the de-energized state. Preferably, the bistable valve also has a first coil. An armature of the bistable valve, which preferably carries the permanent magnet, can be brought into the first detent position as a result of energizing of the first coil. The armature of the bistable valve can then be brought into a second magnetic detent position as a result of energizing of the first coil in the opposite direction. Preferably, the bistable valve additionally has a second permanent magnet and/or a second coil, which, particularly preferably, are similar in configuration to the first permanent magnet and/or the first coil. Thus, the bistable valve can preferably magnetically latch in two detent positions. If no other force then acts upon the armature or it can be mechanically and/or magnetically latched in the detent position, the respective switch position is stable because it can be maintained without further energizing of the first and/or second coil.

The bistable valve preferably has a bistable valve port receiving the failure supply pressure, a second bistable valve port connected to the failure brake valve, and a third bistable valve port connected to a vent. The bistable valve is preferably connected in series to the first failure brake valve in such a way that, when the bistable valve is in a first switch position, it is possible for the redundancy pressure, or redundancy control pressure, to be delivered by the first failure brake valve, and, when the bistable valve is in a second switch position, it is not possible for the redundancy pressure, or redundancy control pressure, to be delivered by the first failure brake valve, irrespective of its switch position. When the bistable valve is in this second switch position, the bistable valve preferably connects at least one port to a vent. The bistable valve may be in this second switch position when the vehicle is in a manual mode. If the vehicle is in a manual mode, in which a vehicle driver can apply a brake pressure via a foot-brake valve, a fallback level as described here with the delivery of the failure supply pressure is not desirable.

The vehicle driver can always intervene and brake the vehicle, purely pneumatically, to a standstill. However, if the vehicle is in an automated or partly automated mode, it is preferred to switch the bistable valve to the first switch position, such that the redundancy pressure, or redundancy control pressure, can be delivered in dependence on the switch position of the first failure brake valve based on the received failure supply pressure. In this case, if there is a major single fault or dual fault, the vehicle is then immediately braked and brought to a safe standstill.

Preferably, the electropneumatic assembly has a working valve arrangement, which is connected to the reservoir port and receives reservoir pressure therefrom and is switchable in order to deliver the first redundancy brake pressure at the first redundancy brake-pressure port or to deliver a working pressure at a working port of the electropneumatic assembly, and an electronic control unit for operating the working valve arrangement. The electronic control unit is part of the electropneumatic assembly and is preferably realized as a module with it. The working valve arrangement may be any working valve arrangement as used in electropneumatic modules in electropneumatic braking systems. For example, the working valve arrangement may be modeled after an axle modulator. If the working valve arrangement controls the first redundancy brake pressure at the first redundancy brake-pressure port, the electropneumatic assembly may be referred to as a redundant modulator and may be provided, for example, as a redundant front-axle modulator, a redundant rear-axle modulator, or as a redundant module for providing redundancy brake pressures for a front and/or rear axle and/or trailer control valve and/or parking brake unit. However, the working valve arrangement may also deliver a working pressure at a designated working port of the electropneumatic assembly. For example, the working valve arrangement may also be a valve arrangement for actuation of a parking brake. In this case, the working port could then be connected to a spring-brake cylinder of a parking brake arrangement in order to supply it with air for use in operation of the vehicle.

The electronic control unit of the electropneumatic assembly is preferably connected via a vehicle BUS or other electrical wiring to preferably a central module of the electronically controllable pneumatic braking system and/or to a unit for autonomous driving. It may also be additionally or alternatively connected to an electronic steering means or other systems of the vehicle that can provide brake demand signals.

In an embodiment, it is provided that the electronic control unit operates the first failure brake valve. This is preferred, in particular, if at the same time the electronic control unit controls a first or other upstream fallback level of the electronically controllable pneumatic braking system. For example, if the electropneumatic assembly constitutes a redundancy modulator or redundancy unit that takes over the operation of the electronically controllable pneumatic braking system in the event that a service braking system fails completely or partially, it is preferred that, in the event of this electronic control unit failing, the first failure brake valve is de-energized and thus receives the failure supply pressure and delivers the redundancy pressure, or redundancy control pressure, based on this. Preferably, it may also be provided that the electronic control unit operates the bistable valve. However, the bistable valve may also be operated by any other electronic control unit that has items of information about whether the vehicle is in autonomous or manual mode.

According to a further embodiment, it is provided that the failure safety-valve arrangement has a second failure brake valve, realized as a monostable valve, that is pneumatically connected in series to the first failure brake valve. The sequence between the first failure brake valve, the second failure brake valve and the bistable valve is functionally irrelevant and may be selected as desired in order to choose the simplest possible structure.

The second failure brake valve is preferably operated by a further electronic control unit. The further electronic control unit is different from the electronic control unit that operates the first failure brake valve and/or from the electronic control unit that operates the bistable valve and/or from the electronic control unit that operates the working valve arrangement. The further electronic control unit is preferably supplied by a further voltage source, which is independent of the voltage source supplying the electronic control unit. In this way, a further level of safety can be added. One of the failure brake valves is assigned to each control unit, namely the first failure brake valve to the electronic control unit, and the second failure brake valve to the further electronic control unit. In the operated state, therefore, the first and the second failure brake valves are each kept in a blocking state, or in a state in which no redundancy brake pressure can be delivered, by different, mutually independent electronic control units via a control signal. Preferably, the electronic control unit and the further electronic control unit may at least partially replace the functions of each other. This means that the further electronic control unit can provide functions of the electronic control unit in a redundant manner in the sense of a fallback level, or vice versa, should the first of the two fail. In the event of a multiple fault, that is, a fault that affects several control units and in particular the electronic control unit as well as the further electronic control unit, both the first failure brake valve and the second failure brake valve are de-energized, such that the failure supply pressure can subsequently be passed through them, provided that any bistable valve present also enables this path. The failure supply pressure may then be provided as redundancy pressure, or redundancy control pressure, via the first and second failure brake valves in order subsequently to effect braking of the vehicle. Thus, if both the electronic control unit and the further electronic control unit fail and, as a result, a corresponding operating signal is not provided or is not correctly provided to the first and second failure brake valves, these each switch to their stable state and, as a result, the redundancy pressure, or the redundancy control pressure, is delivered so that the vehicle can subsequently be braked. This aspect is based on the knowledge that, in the case of a plurality of subsystems of a braking system, each having independent electronic control units, a fault may advantageously be manifested by the absence of a control signal for the respective failure brake valve assigned to the electronic control unit. This can be the case, for example, in the event of a power failure, that is, if the power supply for the electronic control unit has failed. Also, the electronic control unit may be realized in such a way that in the event of an exception error, in particular a case in which the control logic can no longer ensure the safety of the vehicle, a zero signal is output as the control signal for the failure brake valve, thus simulating absence of the control signal. If this is the case, that is, if a fault, in particular in the form of an exception error or power failure, is present on both subsystems, the failure safety-valve arrangement according to this embodiment ensures safe deceleration of the vehicle by providing the redundancy pressure, or redundancy control pressure.

In addition to the second failure brake valve, third and further failure brake valves of this type may also be connected in series. The advantages and embodiments described then apply in the same way.

Preferably, the working valve arrangement has at least a first electromagnetic pilot unit and a first main valve unit, wherein the first pilot unit is connected to the reservoir port and delivers a first working control pressure at the first main valve unit in dependence on first switching signals of the electronic control unit, wherein the first main valve unit is connected to the reservoir port and delivers a first working brake pressure in dependence on the received first working control pressure. The pilot unit, in a manner that is generally known, may have inlet and outlet valves, each of which may be realized as a 2/2-way valve.

The pilot unit may also have, as an inlet-outlet valve unit, a 3/2-way valve or other combinations of 2/2-way and 3/2-way valves. The main valve unit may, in a known manner, include a relay valve or a pneumatically switchable main valve or other valve combinations. The electromagnetic pilot unit provides the first working control pressure, which is volume-boosted and then delivered, volume-boosted as working brake pressure, by the first main valve unit.

In an embodiment, the working valve arrangement has a second electromagnetic pilot unit and a second main valve unit, wherein the second pilot unit is connected to the reservoir port and delivers a second working control pressure at the second main valve unit in dependence on second switching signals of the electronic control unit, wherein the second main valve unit is connected to the reservoir port and delivers a second working brake pressure in dependence on the received second working control pressure. The electropneumatic assembly according to this embodiment may be referred to as a so-called dual-channel modulator, since the electropneumatic assembly according to this embodiment can deliver two mutually independently generated working pressures, namely the first working brake pressure and the second working brake pressure. Such an electropneumatic assembly, realized as a dual-channel modulator, may be used, for example, as a dual-channel axle modulator to provide a brake pressure to the left and right wheels of an axle in a wheel-specific manner. However, it may also, in a so-called longitudinally integrated manner, deliver a pressure for a first and a second axle, which is then modulated at the axle in a wheel-specific manner, for example via ABS valves. In this respect, for example, the first working brake pressure may be provided to a front axle, and the second working brake pressure to a rear axle. Preferably, the first working brake pressure may also be provided to a front axle, and the second working brake pressure to a trailer control valve. In all other respects, that which has already been described with regard to the first electromagnetic pilot unit and the first main valve unit applies to the configuration of the second electromagnetic pilot unit and of the second main valve unit.

In a second aspect, the disclosure achieves the object stated at the outset, in the case of an electronically controllable pneumatic braking system of the type stated at the outset that includes a front axle modulator for providing a front-axle service-brake pressure at a first front-axle service-brake actuator and at a second front-axle service-brake actuator on a front axle of the vehicle; and a rear-axle modulator for providing a rear-axle service-brake pressure at least at a first rear-axle service-brake actuator and at a second rear-axle service-brake actuator on a rear axle of the vehicle, by an electropneumatic assembly according to any one of the embodiments of an electropneumatic assembly according to the first aspect of the disclosure described above, wherein further the first redundancy brake-pressure port is connected to a front-axle redundancy port of the front-axle modulator and/or to a rear-axle redundancy port of the rear-axle modulator, in order to cause redundant delivery of the front-axle service-brake pressure and/or rear-axle service-brake pressure.

In an embodiment, the electronically controllable pneumatic braking system has a central control unit, which provides front-axle brake signals at the front axle modulator in order to cause electronic delivery of the front-axle service-brake pressure, and which provides rear-axle brake signals at the rear-axle modulator in order to cause electronic delivery of the rear-axle service-brake pressure, wherein the central control unit operates the first failure brake valve. The central control unit is preferably integrated with the rear axle-modulator such that the rear-axle modulator is only a functional part of the central control unit. The central control unit is preferably the central control unit of a service braking system of the electronically controllable pneumatic braking system and controls the electronically controllable pneumatic braking system during operation. The central control unit may be connected, for example, to the front-axle modulator via a BUS connection, or control electromagnetic valves of the front-axle modulator by direct electrical wiring. It may be provided that the front-axle modulator is supplied with reservoir pressure from the first compressed-air reservoir, and the rear-axle modulator is supplied with reservoir pressure from a second compressed-air reservoir, or vice versa. In this embodiment, the electropneumatic assembly is preferably not part of the central control unit, although this may be provided in particular embodiments. It may be provided that the central control unit is the electronic control unit that operates the failure safety-valve arrangement, that is, in particular the first failure brake valve, the optionally provided bistable valve and possibly also the second failure brake valve, although this is preferably operated by another control unit, namely in particular the further electronic control unit.

In an embodiment, the electropneumatic assembly is a secondary brake module of the electronically controllable pneumatic braking system and is configured to cause redundant delivery of the front-axle service-brake pressure and/or rear-axle service-brake pressure in the event of the central control unit being prevented from electronically delivering the front-axle service-brake pressure and/or rear-axle service-brake pressure. In this case, the electropneumatic assembly also includes the electronic control unit, which is then preferably connected, via a vehicle BUS, to an autonomous driving unit and receives brake demand signals from the latter. In this case, the electronic control unit of the electropneumatic assembly is preferably configured to convert the brake demand signals and to effect redundant delivery of the front-axle service-brake pressure or rear-axle service-brake pressure, in particular as first and/or second redundancy brake pressure.

It is only when, for example, the electronic control unit of the electropneumatic assembly has a further fault and cannot, or cannot correctly, effect redundant delivery of the front-axle service-brake pressure or rear-axle service-brake pressure, that the first failure brake valve is de-energized, and in this way the redundancy pressure is delivered, based on the failure supply pressure. In this way, two fallback levels are formed in the braking system. An operating level is preferably represented by the central control unit, a first fallback level by the electropneumatic assembly forming the secondary brake module, and a second fallback level also by the electropneumatic assembly, namely when the electronic control unit of the electropneumatic assembly is in a de-energized state and the first failure brake valve is switched to de-energized, and in this way the first redundancy brake pressure is delivered at the first redundancy brake-pressure port. According to a further embodiment, the electronically controllable pneumatic braking system has a parking brake unit for providing a parking brake pressure at a first spring-brake cylinder and a second spring-brake cylinder on the rear axle of the vehicle, wherein the failure supply port is connected to the first spring-brake cylinder and the second spring-brake cylinder in order to receive the parking brake pressure therefrom as failure supply pressure. The embodiment incorporates the knowledge that continued holding of the braked state of the vehicle is advantageous for the safety of the vehicle. After failure braking via the failure brake valve, leakage may occur in the brake circuit from which the failure supply pressure originates. If the failure supply pressure originates, for example, from the first compressed-air reservoir, it may happen over the long term that the first compressed-air reservoir runs empty because there is a leakage. In this case, the failure supply pressure would then drop again and this would result in the redundancy brake pressure no longer being delivered at the full level or at a sufficient level, such that service-brake actuators receiving it may be released again. However, if the fail-safe supply pressure is provided by a spring-brake cylinder, this pressure is first consumed from the spring-brake cylinder.

As a result, the spring-brake cylinder is partially vented, that is, activated in the direction of compression. If a leakage then occurs, the spring-brake cylinder is emptied further until it is completely empty, but then also fully compressed. The redundancy brake pressure drops, but the vehicle is held by the spring-brake cylinder, such that a safe state is still maintained. The pressure of the spring-brake cylinder is a pressure that is delivered permanently during the driving operation of the vehicle, that can be used, particularly advantageously, as a failure supply pressure.

In an embodiment, it is provided that the electropneumatic assembly is integrated with the parking brake unit to form an assembly. On the one hand, this may be accomplished by complete integration into a housing, or by flanging the electropneumatic assembly onto an existing parking brake unit. This is advantageous, in particular, if the parking brake pressure is used as failure supply pressure, although this is not absolutely necessary, but the electropneumatic assembly may also be integrated with the parking brake unit, even though the failure supply pressure originates from another source such as, in particular, the first compressed-air reservoir, the second compressed-air reservoir or a further compressed-air reservoir.

Provided in a further embodiment is a trailer control valve for providing a trailer brake pressure at a trailer brake pressure port, wherein the first redundancy brake pressure port or a further redundancy brake pressure port of the electropneumatic assembly is connected to a trailer redundancy port of the trailer control valve, in order to cause redundant operation of the trailer brake pressure. The trailer control valve may in turn be operated directly by the central control unit, or may also have its own intelligence in the form of an electronic control unit, preferably connected via a BUS to the central control unit and/or the vehicle BUS, in order thereby to receive brake demand signals. According to this embodiment, however, the trailer control valve also includes a trailer redundancy port at which the trailer control valve can receive a pneumatic control pressure for redundantly delivering the trailer brake pressure. According to this embodiment, the trailer can thus also be braked redundantly and brought to a standstill in the second or further fallback level via the electropneumatic assembly.

In a third aspect, the disclosure achieves the object stated at the outset by a method for controlling an electronically controllable pneumatic braking system according to any one of the embodiments, described above, of an electronically controllable braking system according to the second aspect of the disclosure, including the steps of: providing a reservoir pressure at a reservoir port of an electropneumatic assembly; providing, at a failure supply port of the electropneumatic assembly, at least while the vehicle is moving, a failure supply pressure that is limited with respect to and lower than the reservoir pressure; and locking out the failure supply pressure when the electronically controllable pneumatic braking system is in a fault-free state.

In an embodiment, the method, in the event of a fault of the electronically controllable braking system, includes the steps of: de-energizing a first failure brake valve of the electropneumatic assembly; and passing the failure supply pressure through the first failure brake valve to activate redundant braking of the vehicle via front-axle service-brake actuators and/or rear-axle service-brake actuators. The method may further include the step of: limiting the level of the failure supply pressure, preferably via a pressure limiter.

BRIEF DESCRIPTION OF DRAWINGS

The invention will now be described with reference to the drawings wherein.

DETAILED DESCRIPTION

Figure 1:
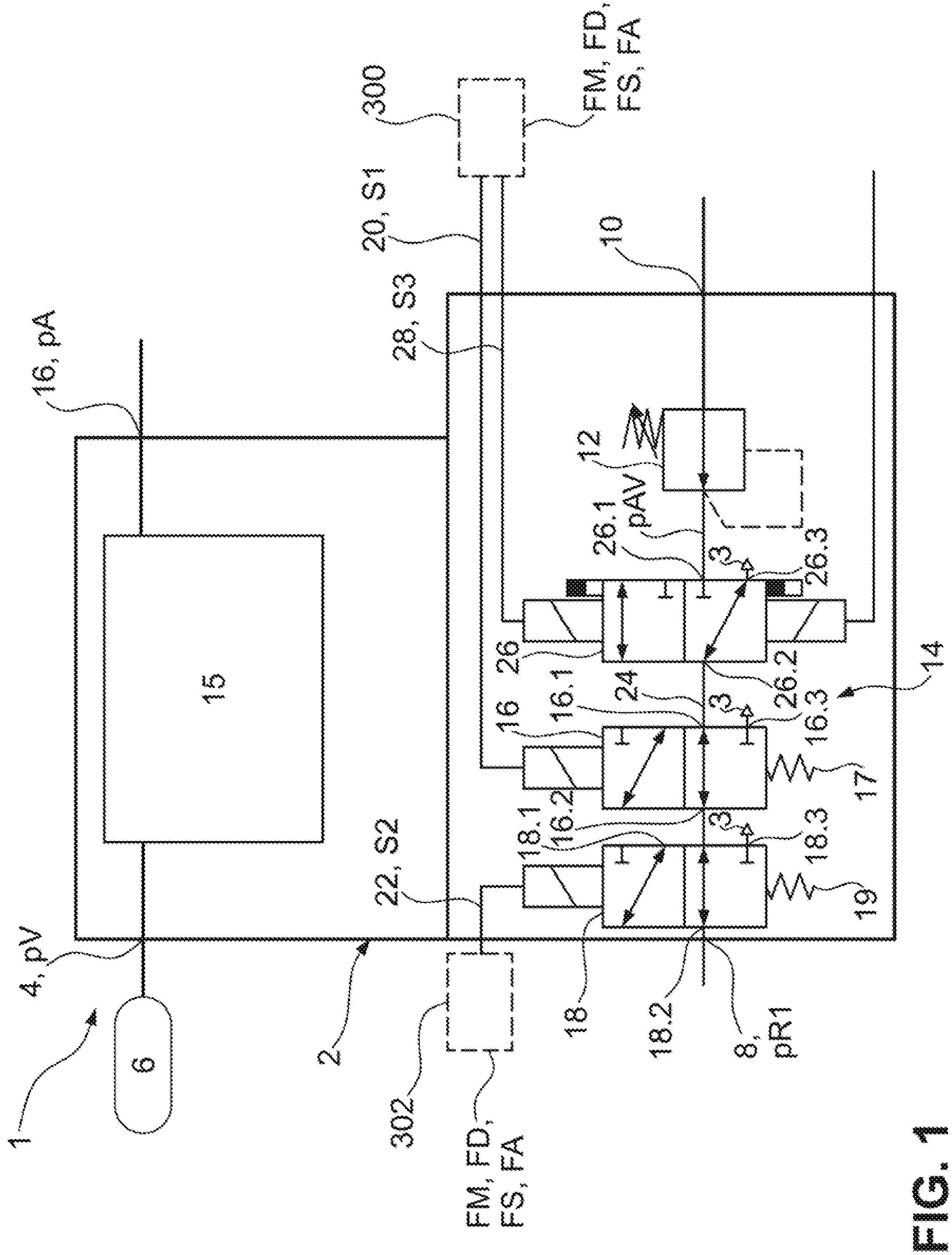
FIG. 1 shows a first embodiment of an electropneumatic assembly.

FIG. 1 shows an electropneumatic assembly 1 according to the disclosure. The electropneumatic assembly 1 has a housing 2 in which a plurality of valves are integrated, as will be described below. On the housing, the electropneumatic assembly 1 has a reservoir port 4 via which the electropneumatic assembly 1 receives reservoir pressure pV from at least a first compressed-air reservoir 6. In addition, the electropneumatic assembly 1 has a first redundancy brake-pressure port 8 for providing a first redundancy brake pressure pR1 for a first axle A1, for example a front axle VA (cf. FIG. 2) of a vehicle 200, in particular a commercial vehicle 202. In addition, the electropneumatic assembly 1 has a failure supply port 10 for receiving a failure supply pressure pAV, which is limited with respect to and lower than the reservoir pressure pV. In the embodiment shown in FIG. 1, the failure supply port 10, via which the electropneumatic assembly 1 can be provided with a failure supply pressure pAV that is limited with respect to and lower than the reservoir pressure pV, is provided inside the electropneumatic assembly 1. However, it is not absolutely necessary for the pressure already received at the failure supply port 10 to be limited, but rather pressure limitation may also be effected inside the electropneumatic assembly 1, as shown in FIG. 1. There, a pressure limiter 12 is connected immediately downstream of the failure supply port 10, such that the pressure delivered by the pressure limiter 12 is the limited failure supply pressure pAV. According to the embodiment shown in FIG. 1, the reservoir port 4 is connected, inside the electropneumatic assembly 1, to a working valve arrangement 15 that receives the reservoir pressure pV and delivers a working pressure pA at a first working port. The working pressure pA may be, for example, a brake pressure for one or more axles of the vehicle 200, a trailer brake pressure or a parking brake pressure. The working valve arrangement 15 may have one or more electrically switchable electromagnetic valves, as will be described in more detail below. In addition to the working valve arrangement 15, the electropneumatic assembly 1 may also include an electronic control unit, not shown in FIG. 1, which controls at least the working valve arrangement 15.

The electropneumatic assembly 1 has a failure safety-valve arrangement 14, which is connected to both the failure supply port 10 and the redundancy brake-pressure port 8. The failure safety-valve arrangement 14 serves to deliver the first redundant brake pressure pR1 in the event of a failure of the electronically controllable pneumatic braking system 204 (cf. FIG. 2) of the vehicle 200, in order thereby to enable safe deceleration of the vehicle [100] 200, preferably to a standstill. The purpose of this is to implement a fail-safe feedback control. For this purpose, the failure supply pressure pAV is passed through or, if necessary, volume-boosted by the failure safety-valve arrangement 14, and delivered as a first redundancy brake pressure pR1 at the first redundancy brake-pressure port 8. The latter is then in turn connected or connectable to one or more corresponding redundancy ports of the electronically controllable pneumatic braking system 204, as will be described in more detail below.

In the embodiment shown in FIG. 1, the failure safety-valve arrangement 14 includes a first monostable failure brake valve 16 and an optional second monostable failure brake valve 18.

The first failure brake valve 16 is connected to a first electronic control unit 300 via a first control line 20 to carry signals and energy. The first control unit 300 in this case is assigned to a first redundancy level B2 (cf. FIG. 2) of the electronically controllable pneumatic braking system 204. The second failure brake valve 18 is connected to a second electronic control unit 302 via a second control line 22 to carry signals and energy. The second electronic control unit 302 in this case is assigned to a first operating level B1 of the electronically controllable pneumatic braking system 204 not represented in greater detail in FIG. 1.

The first failure brake valve 16 and the second failure brake valve 18 are pneumatically connected in series in a valve main line 24 of the failure safety-valve arrangement 14. The valve main line 24 in this case extends from the failure supply port 10 to the first redundancy brake-pressure port 8.

The first failure brake valve 16 and the second failure brake valve 18 are represented here in a non-activated and de-energized state, in which they are each in an open position. In the open position, a pneumatic connection is established between a first failure brake-valve port 16.1 and a second failure brake-valve port 16.2 of the first failure brake valve 16. In the activated switch position, not shown in FIG. 1, the second failure brake-valve port 16.2 is connected to a third failure brake-valve port 16.3, which in turn is connected to a vent 3. In the open position of the second failure brake valve 18, a pneumatic connection is established between a fourth failure brake-valve port 18.1 and a fifth failure brake-valve port 18.2 of the second failure brake valve 18. A sixth failure brake-valve port 18.3 of the second failure brake valve 18 is again connected to a vent 3. In the de-energized stable switch position, the fifth failure brake-valve port 18.2 is connected to the sixth failure brake-valve port 18.3, such that the first redundancy brake-pressure port 8 is vented.

By provision of a first switching signal S1 via the first control line 20, the first failure brake valve 16 can be switched, against the resistance of a first return spring 17, from the open position to a venting position. In the vent position, a pneumatic connection is established between the first failure brake-valve port 16.1 and the third failure brake-valve port 16.3. By provision of a second switching signal S2 via the second control line 22, the second failure brake valve 18 can be switched, against the resistance of a second return spring 19, from the open position to a venting position. In the vent position, a pneumatic connection is established between the fourth failure brake-valve port 18.1 and the sixth failure brake-valve port 18.3.

When the vehicle 200 is in normal operating mode, it is provided, in particular, that the two failure brake valves 16, 18 are in their respective vent position, such that the first redundancy brake-pressure port 8 is vented. In this state, there is thus no pneumatic connection between the failure supply port 10 and the first redundancy brake-pressure port 8, since the pneumatic connection is interrupted at least at two sites, namely at the first failure brake valve 16 and at the second failure brake valve 18.

In the embodiment shown in FIG. 1, additionally arranged in the valve main line 24 there is a bistable valve 26 that is pneumatically connected in series to the first failure brake valve 16 and also to the second failure brake valve 18. Specifically, in the embodiment shown here, the bistable valve 26 is connected between the first failure brake valve 16 and the pressure limiter 12. Thus, as viewed from the failure supply port 10, the bistable valve 26 is connected upstream of the first and second failure brake valves 16, 18. The bistable valve 26 has a first bistable valve port 26.1, a second bistable valve port 26.2 and a third bistable valve port 26.3. The bistable valve 26 has a first and a second stable switch position, and in FIG. 1 it is shown in the second stable switch position in FIG. 1. In the first stable switch position, the first bistable valve port 26.1 is connected to the second bistable valve port 26.2, and pneumatic connection between the failure supply port 10 and the first redundancy pressure port 8 is possible when the first and the second failure brake valve 16, 18 are also in the switch position shown in FIG. 1. However, if the bistable valve 26 is in the second switch position, as shown in FIG. 1, the second bistable valve port 26.2 is connected to the third bistable valve port 26.3, which in turn is connected to a vent 3. In this way, the main valve line 24 is vented and a first redundancy brake pressure pR1 cannot be delivered. The bistable valve 26 is connected to the first electronic control unit 300 via a bistable-valve signal line 28, but could equally be connected to the second electronic control unit 302 or another electronic control unit, not shown in FIG. 1. In response to a third switching signal S3, the bistable valve 26 can be switched back and forth between the two stable switch positions. In particular, the bistable valve 26 is switched in dependence on an autonomous operating mode of the vehicle 200. If the vehicle 200 is in a manual operating mode, delivery of the first redundancy brake pressure pR1 is usually not necessary, as it can be braked pneumatically by actuation of a foot brake pedal 262, as described in more detail later with reference to FIG. 2. The delivery of the first redundant brake pressure pR1 serves, in particular, to prevent uncontrolled coasting of the vehicle 200 when the vehicle 200 is in an autonomous operating mode. In this respect, in the manual operating mode, the bistable valve 26 can be moved to the second switch position shown in FIG. 1, while in the automated operating mode of the vehicle 200 it is preferably in the first switch position, not shown in FIG. 1, in order then, in the event of a fault, to enable the failure supply pressure pAV to be passed through and to enable the main line 24 to be released.

In manual driving mode, the switch position of the first and second failure brake valves 16, 18 is irrelevant, as the valve main line 24 is vented by the bistable valve 26 in any case. In this way, the first and second failure brake valves 16, 18 can remain in their stable switch position, thus saving electrical energy. However, if the bistable valve 26 is in the first switch position, not shown in FIG. 1, such that it can in principle release the valve main line 24, the first and second failure brake valves 16, 18, or at least one of the two, must be brought into the activated switch position, not shown in FIG. 1, in order to leave the valve main line 24 still vented and thus prevent the first redundancy brake pressure pR1 from being delivered. In automated operating mode, the first electronic control unit 300 and the second electronic control unit 302 thus provide the first and second switching signals S1, S2 such that the first and second failure brake valves 16, 18 are energized.

In the event of a multiple fault FM, in particular a dual fault FD, that is, if both the first switching signal S1 and simultaneously the second switching signal S2 are absent, and both the first failure brake valve 16 and the second failure brake valve 18 are thus de-energized, both the first failure brake valve 16 and the second failure brake valve 18 automatically return to their open position shown in FIG. 1 due to the restoring force generated by the respective return spring 17, 19.

Such a dual fault FD may be caused, for example, by a simultaneous power failure FS in both the operating level B1 and the first redundancy level B2, when both the first electronic control unit 300 and the second electronic control unit 302 are without energy supply. Accordingly, in such a simultaneous power failure FS, no switching signal S1, S2 can be directed to the first and second failure brake valves 16, 18.

Furthermore, a dual fault FD may also manifest itself in the occurrence of an exception error FA both in the first electronic control unit 300 and in the second electronic control unit 300, and in a zero signal being switched by the respective electronic control unit 300, 302 as a fault measure (in particular in the absence of other program alternatives), and thus the first and second switching signals S1, S2 being set to 0 for the purpose of switching the first and second failure brake valves 16, 18 to the open position. In this regard, for the presence of a multiple fault FM, various types of faults may be present in the individual electronic control units 300, 302; for example, in the case of a dual fault FD, there may be a power failure [FA] FS in the first electronic control unit 300 and there may be an exception error FA in the second electronic control unit 302, or vice versa.

Figure 2:
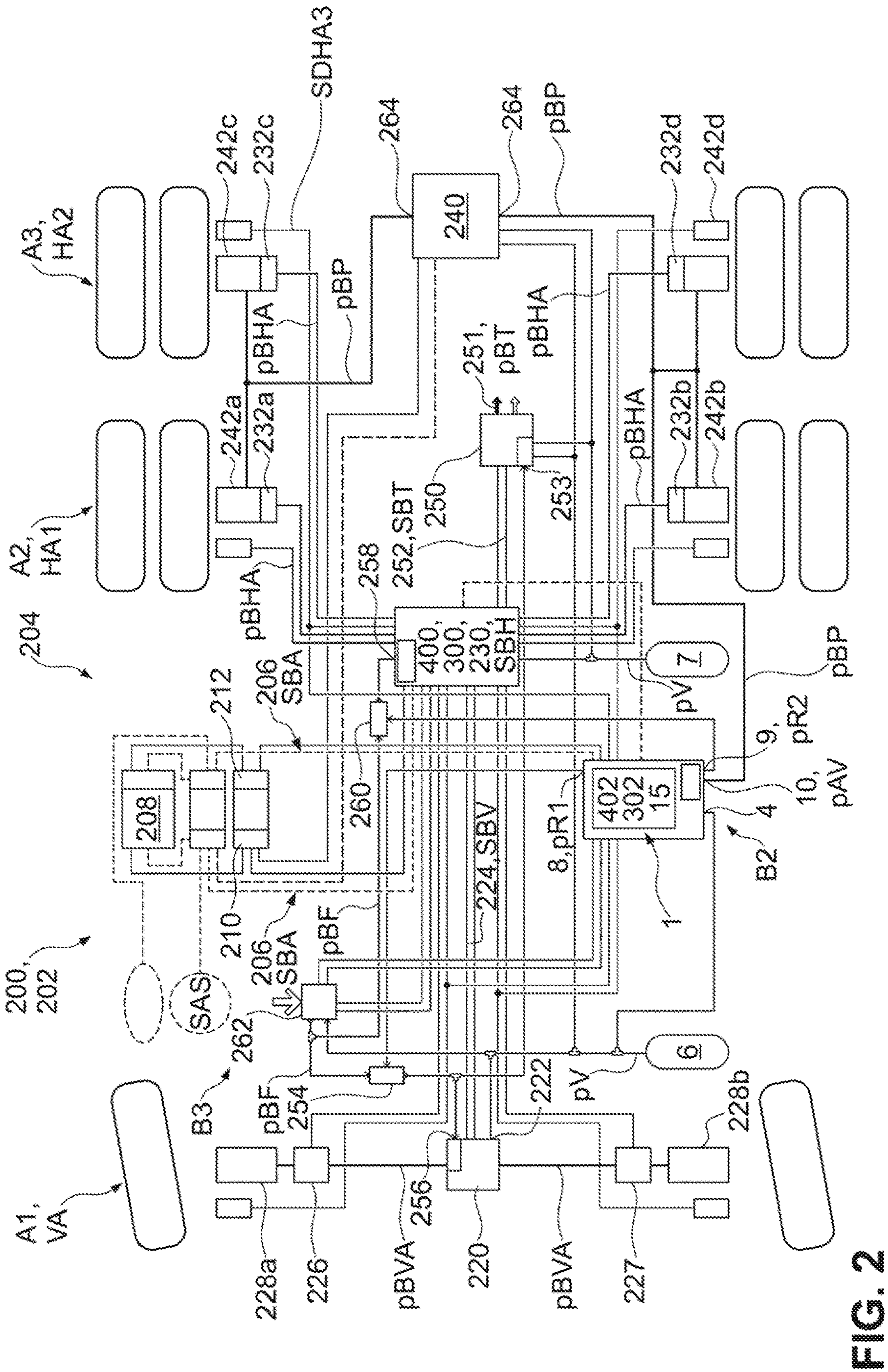
FIG. 2 shows a commercial vehicle having an electronically controllable pneumatic braking system and an electropneumatic assembly.

Illustrated now in FIG. 2 is a vehicle 200, namely in particular a commercial vehicle 202, having a first axle A1, which here is a front axle VA, a second axle A2, which here is a first rear axle HAL and a third axle A3, which here is a second rear axle HA2. The vehicle 200 includes an electronically controllable pneumatic braking system 204, which has an operating level B1 and a first redundancy level B2. It additionally includes a second redundancy level B3, as described below, and an electropneumatic assembly 1 that is configured to brake the vehicle 200 in the event of a dual fault FD or a major single fault occurring in the operating level B1 and in the first and/or the second redundancy level B2, B3.

In the operating level B1, the electronically controllable pneumatic braking system 204 includes a central control unit 400, also referred to as a central module, which, via a vehicle BUS 206, is connected to an autonomous driving unit 208 and receives braking demand signals SBA from it. The central control unit 400 is supplied with electrical energy from a first voltage source 210.

On the front axle VA, the electronically controllable pneumatic braking system 204 includes a front-axle modulator 220, which is realized here as a single-channel modulator and receives reservoir pressure pV from a first compressed-air reservoir 6. For this purpose, the front-axle modulator 220 includes, in a known manner, a front-axle reservoir port 222, which is pipe-connected to the first compressed-air reservoir 6. The front-axle modulator 220 is connected, via a front-axle signal line 224, to the central control unit 400, and from it receives front-axle brake signals SBV that cause one or more electromagnetic valves (not shown) of the front-axle modulator 220 to switch, as a result of which the front-axle modulator 220 delivers a front-axle brake pressure pBVA, which is delivered via first and second ABS valves 226, 227 at a first front-axle service-brake actuator 228*a* and a second front-axle service-brake actuator 228*b* in a wheel-specific manner. On the one hand, the front-axle signal line 224 may be implemented as direct wiring of the electromagnetic valves of the front-axle modulator 220 to the central control unit 400, such that final stages for electromagnetic valves of the front-axle modulator 220 are preferably integrated into the central control unit 400. Alternatively, the front-axle signal line 224 may also be realized as a BUS connection (CAN-BUS), in particular if the front-axle modulator 220 has its own intelligence.

The electronically controllable pneumatic braking system 204 also includes a rear-axle modulator 230, which here is integrated in the central control unit 400, together with the first electronic control unit 300. The rear-axle modulator 230 receives reservoir pressure pV from a second compressed-air reservoir 7. The first electronic control unit 300 converts the brake demand signals SBA, received via the vehicle BUS 206, into a rear-axle brake signal SBH and switches one or more electromagnetic valves of the rear-axle modulator 230, which are not shown in detail here, such that a rear-axle service-brake pressure pBHA is generated, which is delivered at first and second rear-axle service-brake actuators 232*a*, 232*b* at the first rear axle HA1 and to third and fourth rear-axle service-brake actuators 232*c*, 232*d* at the second rear axle HA2. The rear-axle service-brake pressure pBHA is delivered in a side-specific manner, and in this respect the rear-axle modulator 230 is a dual-channel modulator.

In addition, the electronically controllable pneumatic braking system 204 shown here includes a parking brake unit 240, which is likewise connected to the vehicle BUS 206 and to the first voltage source 210 and receives electrical energy from the latter. Here, the parking brake unit 240 is connected to both the first and the second compressed-air reservoir 6, 7 and receives reservoir pressure pV from both. The layout shown in FIG. 2 relates to a configuration found primarily in North America, in which no separate parking brake reservoir is provided. It is to be understood that, instead of the first and second compressed-air reservoirs 6, 7 being connected to the parking brake unit 240, there may also be a third compressed-air reservoir, which separately supplies reservoir pressure to the parking brake unit 240.

The parking brake unit is configured to deliver a parking brake pressure pBP, via a spring accumulator port 264, at first and second spring-brake cylinders 242*a*, 242*b* at the first rear axle HAL and to third and fourth spring-brake cylinders 242*c*, 242*d* at the second rear axle HA2.

The electronically controllable pneumatic braking system 204 is also configured to supply a trailer, and for this purpose has a trailer control unit 250, which likewise receives reservoir pressure pV from both the first compressed-air reservoir 6 and the second compressed-air reservoir 7. The trailer control unit 250 is connected to the central control unit 400 and receives trailer brake signals SBT from it via a trailer signal line 252. In this respect, the trailer control unit 250 is also supplied by the first voltage source 210. In dependence on the received trailer brake signal SBT, the trailer control unit 250 delivers a trailer brake pressure pBT at a trailer brake pressure port 251. For example, a normal service brake signal, an anti-jackknife braking function signal for implementing an anti-jackknife braking function, or a trailer parking signal for parking the trailer may be transferred via the trailer brake signal SBT.

In order to realize a first redundancy level B2, which in this case is electrical, the electronically controllable pneumatic braking system 204 includes a secondary brake module 402, into which the second electronic control unit 302 is also integrated. The secondary brake module may be realized as or include an electropneumatic assembly 1. Accordingly, the secondary brake module 402 is also connected to the first compressed-air reservoir 6 and receives reservoir pressure pV from it. The secondary brake module 402 is likewise interfaced to the vehicle BUS 206, via which it receives brake demand signals SBA. It is supplied by a second voltage source 212, which is independent of the first voltage source 210. The second electronic control unit 302 is able to process the brake demand signals SBA and to operate a working valve arrangement 15 in order to deliver a first working pressure pA1, possibly as a first redundancy brake pressure pR1, at a first redundancy brake-pressure port 8, and to deliver a second working pressure pA2, possibly as a second redundancy brake pressure pR2, at a second redundancy brake-pressure port 9. The first redundancy brake pressure pR1 is here provided to the front axle VA and the second redundancy brake pressure pR2 is here provided to the rear axle HAL HA2. More precisely, the first redundancy brake pressure pR1 is delivered in a fundamentally known manner, via a first shuttle valve 254, at a front-axle redundancy port 256 of the front-axle modulator 220. The front-axle modulator 220 then converts the first redundancy brake pressure received at this port and, based on this, delivers the front-axle brake pressure pBVA in redundant manner. For this purpose, the front-axle modulator 220 may, in a fundamentally known manner, have a monostable redundancy valve, as well as a relay piston or a pneumatically switchable main valve, in order to deliver in a volume-boosted manner the first redundancy brake pressure pR1 provided at the front-axle redundancy port 256. The first redundancy brake pressure pR1 is also delivered at a trailer redundancy port 253, in order thus to enable redundant braking of a trailer.

In a corresponding manner, the rear-axle modulator 230 or the central control unit 400, into which the rear-axle modulator 230 is integrated, has a rear-axle redundancy port 258 at which the second redundancy brake pressure pR2 can be provided via a second shuttle valve 260. The secondary brake module 402 thus delivers the first and second redundancy brake pressures pR1, pR2 in an axle-specific manner, and can thus again be described as a dual-channel modulator. The central control unit 400 is then in turn configured to deliver the rear-axle brake pressure pBHA based on the received second redundancy brake pressure pR2. For this purpose, the central control unit 400 may in turn, in a fundamentally known manner, have a redundancy valve, as well as a relay piston or a pneumatically switchable main valve, in order to deliver the second redundancy brake pressure pR2 in a volume-boosted manner, as rear-axle brake pressure pBHA. In this way, an electronically controllable fallback level, in this case the first redundancy level B2, can be provided.

Moreover, the electronically switchable pneumatic braking system 204 shown in FIG. 2 has a fallback level B3 that can be actuated manually and that, in the embodiment shown here, includes a foot brake pedal 262. The foot brake pedal 262 can be used to deliver a foot brake pressure pBF to both the first shuttle valve 254 and the second shuttle valve 260. The first and second shuttle valves 254, 260 are each configured to deliver the higher of the applied foot brake pressure pBF and of the first and second redundancy pressures pR1, pR2 at the front-axle modulator 220 and rear-axle modulator 230, respectively. In this way, for example, the delivered first and the second redundancy brake pressure pR1, pR2 can be overridden by actuation of the foot brake pedal 262. Conversely, the secondary brake module 402 can also override the foot brake pressure pBF delivered by a driver.

A third redundancy level, which here according to the disclosure, however, is realized here only as a fail-safe level, is constituted by the electropneumatic assembly 1. The parking brake pressure pBP is connected to the secondary brake module 402, more precisely to the failure supply port 10. The parking brake pressure pBP is a pressure that is limited with respect to the reservoir pressure pV, and that is also reduced. Typical values of reservoir pressures pV are in a range of from 8-12 bar, while the level of the parking brake pressure pBP is typically limited to 8 bar. In the embodiment shown here, the level of the reservoir pressure pV is approximately 12 bar, while the parking brake pressure pBP is approximately 8 bar.

If the electropneumatic assembly 1 is now implemented as shown in FIG. 1, if the vehicle 200 is in autonomous operating mode, the bistable valve 26 is first switched to the first switch position, not shown in FIG. 1. Both the first and the second failure brake valve 16, 18 are energized, while the first electronic control unit 300 and the second electronic control unit 302 function normally.

If the first electronic control unit 300 fails, the first failure brake valve 16 is de-energized first. The second electronic control unit 302 can then, as part of the secondary brake module 402, take over the controlling of the electronically controllable pneumatic braking system 204, as described above, by delivering the first and second redundancy brake pressures pR1, pR2. In the event that this also fails, for example due to the dual fault FD, the second failure brake valve 18 is de-energized and brought by the second spring 19 into the switch position shown in FIG. 1. The parking brake pressure pBP provided at the failure supply port 10 is subsequently further limited by the pressure limiter 12, passed through by the bistable valve 26, the first failure brake valve 16, the second failure brake valve 18 and provided at the first redundancy brake port 8 and delivered as a first redundancy brake pressure pR1, reaches the front-axle redundancy port 256 via the first shuttle valve 254, whereupon the front-axle modulator 220 delivers the front-axle brake pressure pBVA and brakes the front axle VA. Since the parking brake pressure pBP is a static pressure, that is, is not further adapted in dependence on speed, the vehicle 200 is thereby braked to a standstill. Since the parking brake pressure pBP is a limited and reduced pressure, locking of the front axle VA is prevented.

Figure 3:
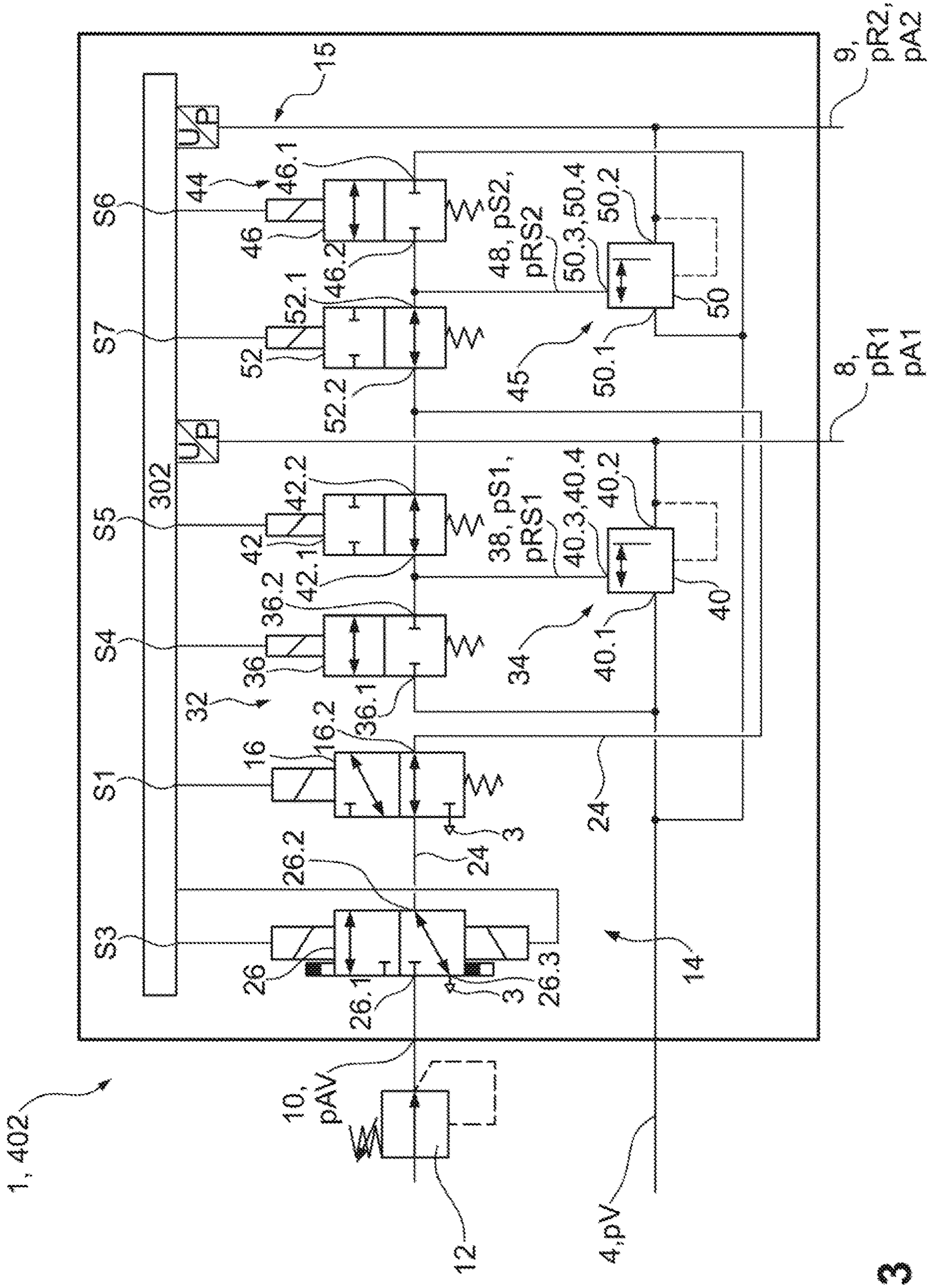
FIG. 3 shows a second embodiment of an electropneumatic assembly.

FIG. 3 now shows the electropneumatic assembly 1 realized as a secondary brake module 402. The secondary brake module 402 has a reservoir port 4 at which the electropneumatic assembly 1 receives reservoir pressure pV, the failure supply port 10, which here is preceded by the pressure limiter 12 and is not integrated as in the embodiment example described with reference to FIG. 1, the failure supply pressure pAV being provided at the failure supply port 10, a first redundancy brake-pressure port 8, at which a first redundancy brake pressure pR1 can be delivered, and a second redundancy brake-pressure port 9, at which a second redundancy brake pressure pR2 can be delivered.

The electropneumatic assembly 1 has the first failure brake valve 16 and the bistable valve 26. A second failure brake valve 18, as described with reference to FIG. 1, is not provided in the embodiment according to FIG. 3. The bistable valve 26 is in turn pneumatically connected upstream of the first failure brake valve 16, as viewed from the failure supply port 10. The bistable valve 26 and the first failure brake valve 16 are pneumatically connected in series in the valve main line 24. In addition to the failure safety-valve arrangement 14, the electropneumatic assembly 1 in this embodiment also has a working valve arrangement 15, which has a structure like that of a fundamentally known dual-channel axis modulator. In the embodiment shown in FIG. 3, the working valve arrangement 15 includes a first electromagnetic pilot unit 32 and a first main valve unit 34. The first electromagnetic pilot unit 32 includes a first inlet valve 36, which is realized as a 2/2-way valve and connected to the reservoir port 4 for the purpose of receiving reservoir pressure pV. The first inlet valve 36 includes a first inlet-valve port 36.1 and a second inlet-valve port 36.2, the first inlet-valve port 36.1 being connected to the reservoir port 4. In a first stable switch position, shown in FIG. 3, the first inlet valve 36 is closed and the first and the second inlet-valve port 36.1, 36.2 are disconnected. On the other hand, in a second, activated switch position, not shown in FIG. 3, the first and the second inlet-valve port 36.1, 36.2 are connected, such that the first inlet valve 36 delivers a first working control pressure pS1 into a first control line 38. Here, the first main valve unit 34 includes a first relay valve 40. The first relay valve 40 has a first relay-valve reservoir port 40.1, a first relay-valve working port 40.2, a relay-valve vent port, not shown here, and a first relay-valve control port 40.3. The first working control pressure pS1 is received at the first relay-valve control terminal 40.3. The first relay valve 40 boosts the volume of this first working control pressure pS1 and correspondingly delivers a first working brake pressure pA1 at the first relay-valve working port 40.2.

In the embodiment shown here, the first relay-valve working port 40.2 is connected to the first redundancy brake-pressure port 8, such that the first working brake pressure pA1 is provided at the first redundancy brake-pressure port 8 and thus also functions as a first redundancy brake pressure pR1. The first redundancy brake-pressure port 9 is connected, as shown in FIG. 2, to the front-axle modulator 220, such that the first redundancy level B2 can be implemented by the actuation of the first pilot unit 32 and the first main valve unit 34.

For this purpose, the second electronic control unit 302 is also integrated into the electropneumatic assembly 1, to form the secondary brake module 402. In the embodiment shown here, the second electronic control unit 302 may provide first pilot-control switching signals S4, S5 at the first pilot unit 32 in order, in particular, to cause the first inlet valve 36 to switch into the second switch position, not shown in FIG. 3. In order to vent the first working control pressure pS1, the first pilot unit 32 also includes a first outlet valve 42. The first outlet valve 42 is again realized as a monostable 2/2-way valve and includes a first outlet valve port 42.1 and a second outlet valve port 42.2. In a first stable switch position, shown in FIG. 3, the first and the second outlet valve port 42.1, 42.2 are pneumatically connected, whereas when the first outlet valve 42 is in the activated state they are pneumatically disconnected. The first outlet valve port 42.1 is connected to the first control line 38, and the second outlet valve port 42.2 is connected to the valve main line 24, in the case shown in FIG. 3 more specifically to the first failure brake valve 16, more specifically, the second failure brake-valve port 16.2. Since the valve main line 24 is typically intended to be vented during normal operation of the vehicle 200, either as shown in FIG. 3, via the bistable valve 26, which connects the second bistable valve port 26.2 to the third bistable valve port 26.3 and thus to the vent 3, or via the first failure brake valve 16 when it is activated, the first control line 38 may also be vented via the first outlet valve 42.

At this point, the difference between the electropneumatic assembly 1 according to the present disclosure and a conventional dual-channel axle modulator also becomes apparent. In a conventional dual-channel axle modulator, the second outlet valve port 42.2 is typically connected either directly to a vent or, via an interposed backup valve or redundancy valve, which may be similar in configuration to the first failure brake valve 16, to a redundancy port via which, for example, a pneumatic redundancy pressure or an anti-compound pressure can be injected and which also functions as a vent during normal operation. In the embodiment of the electropneumatic assembly 1 shown in FIG. 3, however, the bistable valve 26 is additionally provided, as well as the pressure limiter 12, via which the failure supply pressure pAV is permanently applied to the failure supply port 10. The venting of the first control line 38 therefore is not effected via the failure supply port 10, but via the vent 3 of the first failure brake valve 16 and/or of the bistable valve 26. The first relay valve 40 may have its own vent, or may also be connected to one of the vents 3 of the first failure brake valve 16 and of the bistable valve 26.

The working valve arrangement 15 further includes a second electromagnetic pilot unit 44 and a second main valve unit 45, which are similar to the first pilot unit 32 and the first main valve unit 34. In this respect, the second pilot unit 44 also includes a second inlet valve 46, as well as a second outlet valve 52 and a second relay valve 50. Again, the second inlet valve 46 is connected to a third and a fourth inlet-valve port 46.1, 46.2, the third inlet-valve port 46.1 being connected to the reservoir port 4, and the fourth inlet-valve port 46.2 being connected to a second control line 48 into which the second inlet valve 46 delivers a second working control pressure pS2. The second relay valve receives the second working control pressure pS2 in a second relay-valve control port 50.3, receives reservoir pressure pV in a second relay-valve reservoir port 50.1, and delivers a second working brake pressure pA2 at a second relay-valve working port 50.2, which is also connected here to the second redundancy brake-pressure port 9, such that the second working brake pressure pA2 can also function as a second redundancy brake pressure pR2. The second redundancy brake-pressure port 9 is connected (cf. FIG. 2) to the rear-axle modulator 230, such that, via the second pilot unit 44 and the second main valve unit 45, the first redundancy level B2 can be implemented in the electronic delivery. The second outlet valve 52 is again connected to the second control line 48 via the third outlet-valve port 52.1, and to the main valve line 24 via the fourth outlet-valve port 52.2, such that the second control line 48 can also be vented via the failure safety-valve arrangement 14. The second electronic control unit 302 may provide second pilot switch signals S6, S7 in order to bring the second inlet valve 46 and the second outlet valve 52 into the activated switch positions, which are not shown.

In automated operating mode, in particular, when there is no driver present, the bistable valve 26 should be in the first switch position, not shown in FIG. 3, in which the first bistable valve port 26.1 is connected to the second bistable valve port 26.2, such that in principle the failure supply pressure pAV is passed through the bistable valve 26 and is then preferably applied at the second failure brake-valve port 16.2. The first failure brake valve 16 is then in the activated switch position, not shown in FIG. 3, such that the main valve line 24 is connected to the vent 3. If a dual fault FD then occurs and the second electronic control unit 302 also fails, the latter can no longer provide the first and second pilot-control switching signals S4, S5, S6, S7, such that the first inlet valve 36, the first outlet valve 42, the second inlet valve 46 and the second outlet valve 52 each fall back into their monostable switch positions shown in FIG. 3. The first failure brake valve 16 also falls to the stable switch position, shown in FIG. 3, in which the first failure brake-valve port 16.1 is connected to the second failure brake-valve port 16.2. Since the first and second outlet valves 42, 52 are also in their open switch positions, the failure supply pressure pAV delivered by the first failure brake valve 16 can be passed through the valve main line 24 and injected into the first and second control lines 38, 48 via the first and second vent valves 42, 52 and is then applied at the first and second relay-valve control ports 40.3, 50.3. The first and second relay valves 40, 50 then effect volume-boosting of this pressure, namely in this case a first and a second redundancy brake-pressure pRS1, pRS2, respectively, and deliver this, as a first and a second redundancy brake-pressure pR1, pR2, respectively, at the first and second redundancy brake-pressure ports 8, 9. In this way, the vehicle 200 can then be braked safely.

This means that, in contrast to the first embodiment (FIG. 1), the failure safety-valve arrangement 14 in the embodiment shown here (FIG. 3) is not connected directly to the first or second redundancy brake-pressure port 8, 9, but to the first relay-valve control port 40.3, which functions as a first redundancy control port 40.4, and to the second relay valve control port 50.3, which functions as a second redundancy control port 50.4.

It may also be provided, however, that the first relay valve 40 and/or the second relay valve 50 are part of the failure safety-valve arrangement 14.

Figure 4:
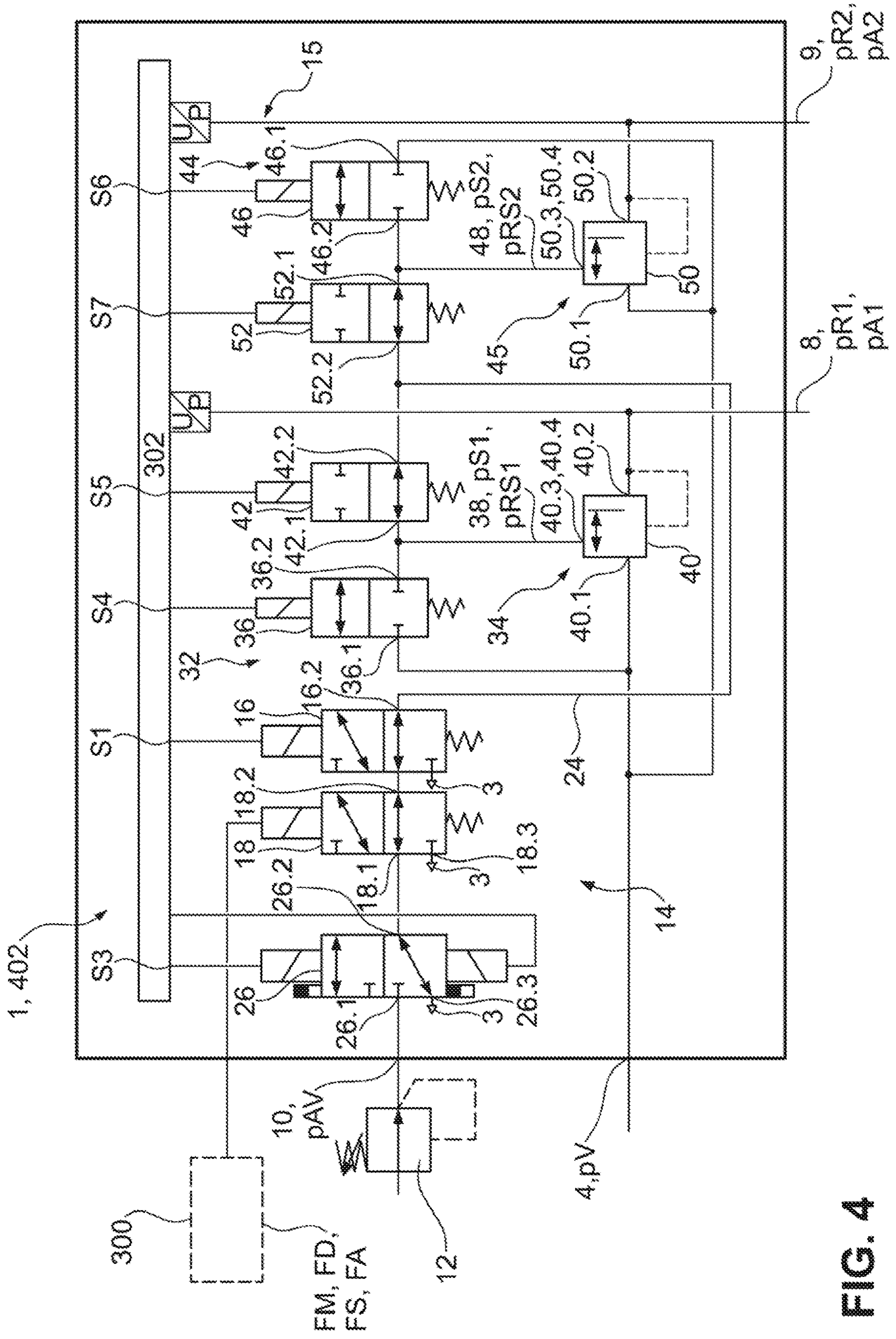
FIG. 4 shows a third embodiment of the electropneumatic assembly.

A third embodiment of the electropneumatic assembly 1 is shown in FIG. 4. Same and similar elements are denoted by the same reference designations as in the previous embodiments, such that reference is made to the entirety of the description above. The third embodiment (FIG. 4) is based on the second embodiment (FIG. 3), and in particular the differences are highlighted below.

In contrast to the second embodiment (FIG. 3), in the third embodiment (FIG. 4) the second failure brake valve 18, as already described with reference to FIG. 1, is provided. It is pneumatically connected in series to the first failure brake valve 16 and the bistable valve 26. It is arranged between the first failure brake valve 16 and the bistable valve 26, although these valves may also be arranged in a different sequence, in particular in order to realize the smallest possible installation space.

The second failure brake valve 18 is controlled, as already described with reference to FIG. 1, by the electronic control unit 300 of the central control unit 400. In this respect, safety is increased in the third embodiment in comparison with the second embodiment, since both the electronic control unit 300 and the electronic control unit 302 must fail in order to effect the delivery of the first redundancy brake pressure pR1 based on the failure supply pressure pAV.

Represented in the fourth embodiment (FIG. 5) is a variant of the electropneumatic assembly that is based substantially on the embodiment of FIG. 1. Same and similar elements are denoted by the same reference designations as in the previous embodiments, such that reference is made to the entirety of the description above. In particular, the differences are highlighted below.

In the fourth embodiment (FIG. 5), the electropneumatic assembly 1 is integrated with a parking brake unit 240. The reservoir port 4 thus also serves to supply reservoir pressure pV to the working valve arrangement 15, which here is used in a fundamentally known manner to deliver the parking brake pressure pBP. For this purpose, both the first compressed-air reservoir 6 and the second compressed-air reservoir 7 are connected to the reservoir port 4, as also shown in FIG. 2.

Figure 5:
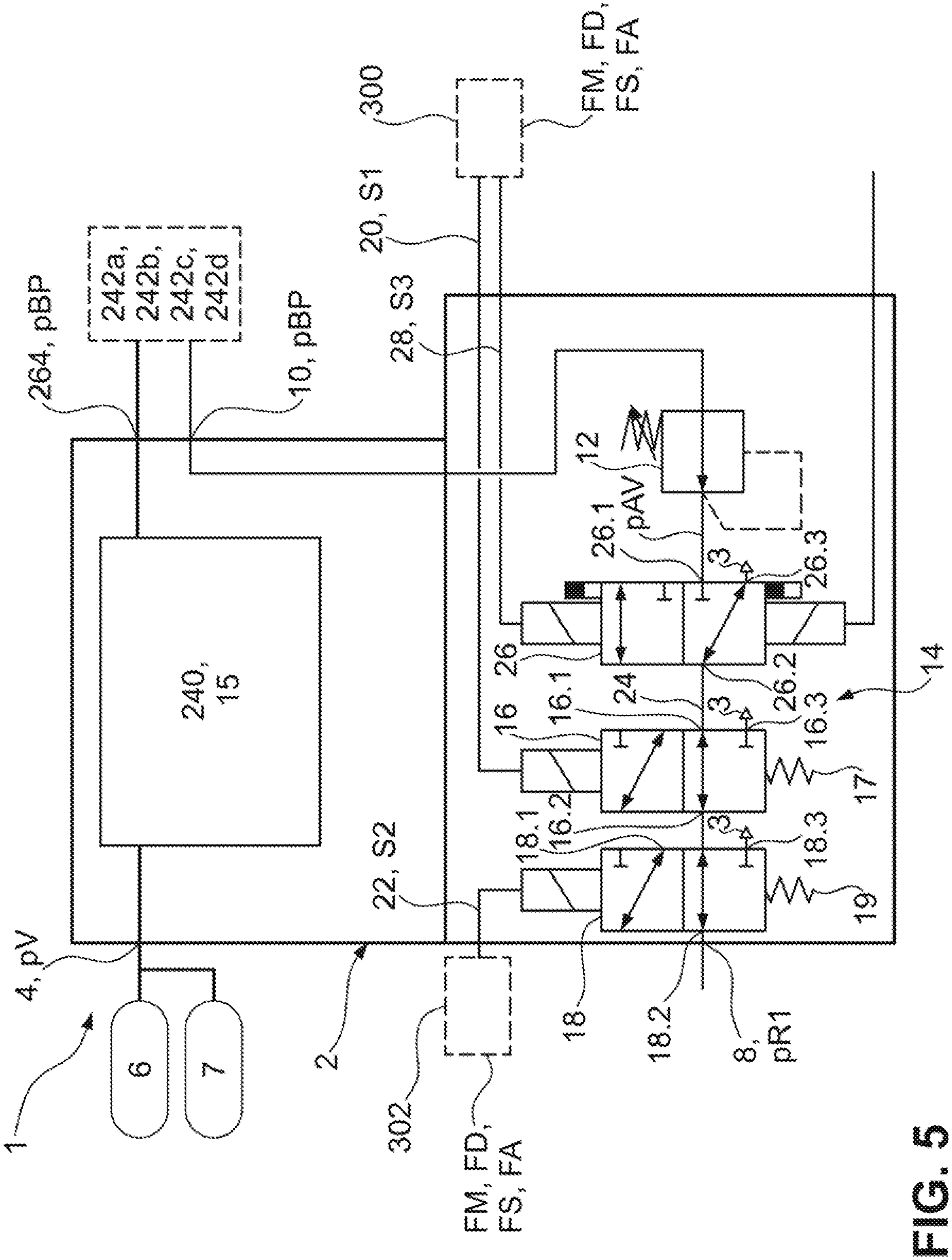
FIG. 5 shows a fourth embodiment of the electropneumatic assembly.

The parking brake unit has a spring accumulator port 264 to which one or more spring-brake cylinders can be connected. In the embodiment of the electronically controllable pneumatic braking system 204 shown in FIG. 2, all four spring-brake cylinders 242*a*, 242*b*, 242*c*, 242*d* are connected to it. The failure supply port 10 is also connected to the spring-brake cylinders 242*a*, 242*b*, 242*c*, 242*d* and receives the parking brake pressure pBP. Here, the pressure limiter 12 is still connected downstream of the failure supply port 10, although this is not absolutely necessary if the parking brake pressure pBP is already sufficiently limited with respect to the reservoir pressure pV. Here, the failure supply port 10 is outside of the housing 2, together with the spring-brake cylinders 242*a*, 242*b*, 242*c*, 242*d*. In the case of an integrated arrangement as shown in FIG. 5, it is also useful to transfer the parking brake pressure pBP internally. In this case, the failure supply port 10 could be arranged immediately downstream of the working valve arrangement 15.

Despite the integration with the parking brake unit 240, the first failure brake valve 16 and the bistable valve 26 are operated by the electronic control unit 300, and the second failure brake valve 18 is operated by the electronic control unit 302. If the parking brake unit 240 has its own intelligence, it is preferred that at least the bistable valve 26 and/or the first failure brake valve 16 and/or the second failure brake valve 18 is/are operated by the intelligence (electronic control unit) of the parking brake unit 240.

Figure 6:
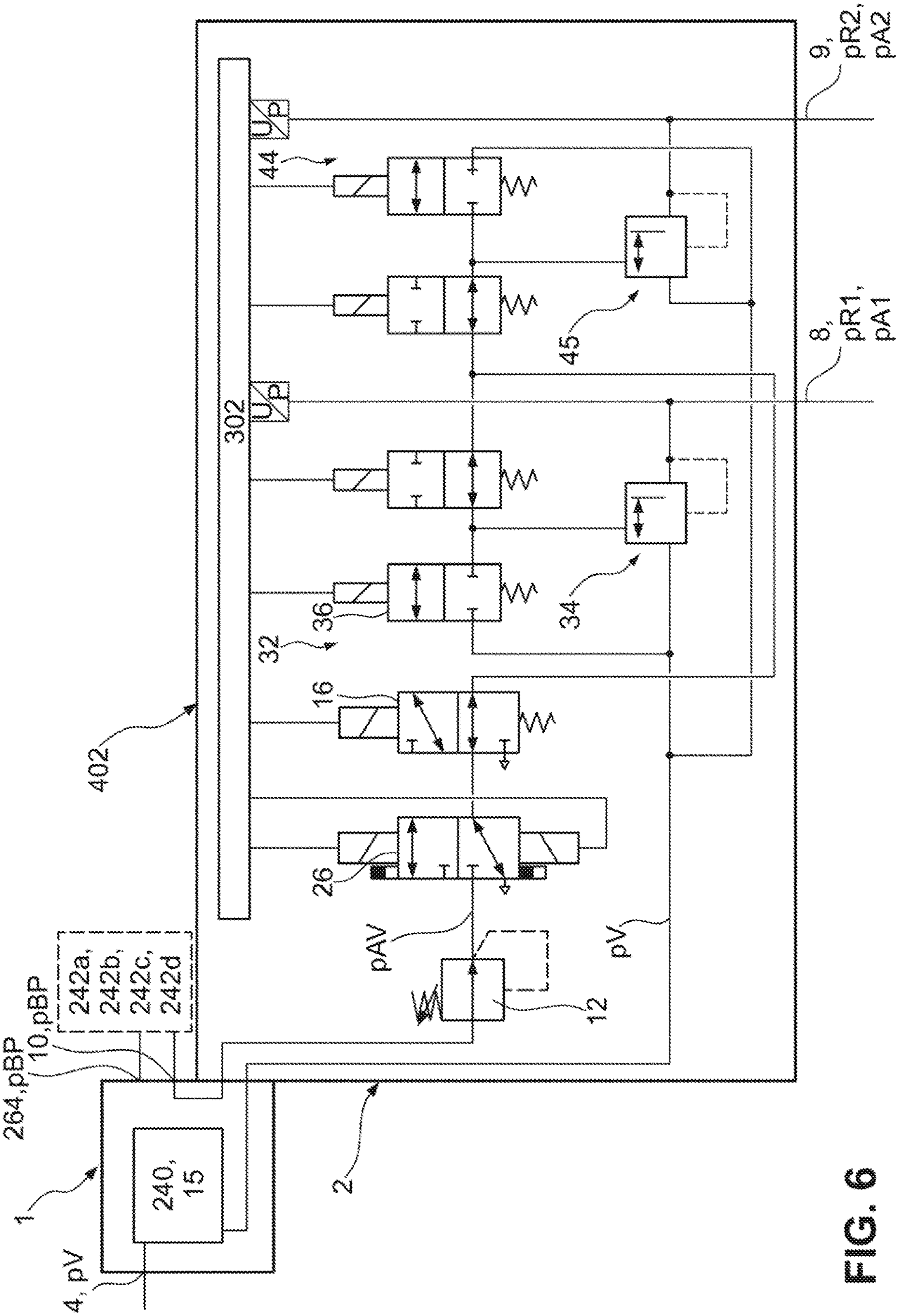
FIG. 6 shows a fifth embodiment of the electropneumatic assembly.

In a fifth embodiment (FIG. 6), embodiments 2 and 4 as shown in FIGS. 3 and 5 are substantially combined. Here, the electropneumatic assembly 1 includes both the parking brake unit 240 as illustrated in FIG. 5 and the secondary brake module 402 as illustrated in FIG. 3. The reservoir port 4 may again be connected to the first compressed-air reservoir 6 and the second compressed-air reservoir 7, although this is not shown in FIG. 6. The reservoir pressure pV is then transferred within the electropneumatic assembly 1 and provided to the first pilot valve unit 32, the second pilot valve unit 44, the first main valve unit 34 and the second main valve unit 45. The parking brake pressure pBP may also preferably be transferred internally within the housing 2, as already described with reference to FIG. 5. In this way, a fully integrated module is created, in which a saving can advantageously be made on parts, in particular valves.

It is understood that the foregoing description is that of the preferred embodiments of the invention and that various changes and modifications may be made thereto without departing from the spirit and scope of the invention as defined in the appended claims.

LIST REFERENCE DESIGNATIONS ART OF THE DESCRIPTION

1 electropneumatic assembly
2 housing
4 reservoir port

6 first compressed-air reservoir
8 first redundancy brake-pressure port
9 second redundancy brake-pressure port
10 failure supply port
12 pressure limiter
14 failure safety-valve arrangement
15 working valve arrangement
16 first monostable failure brake valve
16.1 first failure brake-valve port
16.2 second failure brake-valve port
16.3 third failure brake-valve port
17 first return spring
18 second monostable failure brake valve
18.1 fourth failure brake-valve-port
18.2 fifth failure brake-valve port
18.3 sixth failure brake-valve port
19 second return spring
20 first control line
22 second control line
24 valve main line
26 bistable valve
26.1 first bistable valve port
26.2 second bistable valve port
26.3 third bistable valve port
28 bistable valve signal line
32 first electromagnetic pilot unit
34 first main valve unit
36 first inlet valve
36.1 first inlet-valve port
36.2 second inlet-valve port
38 first control line
40 first relay valve
40.1 first relay-valve reservoir port
40.2 first relay-valve working port
40.3 first relay-valve control port
40.4 first redundancy control port
42 first outlet valve
42.1 first outlet-valve port
42.2 second outlet-valve port
44 second electromagnetic pilot unit
45 second main valve unit
46 second inlet valve
46.1 third inlet-valve port
46.2 fourth inlet-valve port
48 second control line
50 second relay valve
50.1 second relay-valve reservoir port
50.2 second relay-valve working port
50.3 second relay-valve control port
50.4 second redundancy control port
52 second outlet valve
52.1 third outlet-valve port
52.2 fourth outlet-valve port
200 vehicle
202 commercial vehicle
204 electronically controllable pneumatic braking system
206 vehicle BUS
208 autonomous driving unit
210 first voltage source
212 second voltage source
220 front-axle modulator
222 front-axle reservoir port
224 front axle signal line
226 first ABS valve
227 second ABS valve
228*a* first front-axle service-brake actuator
228*b* second front-axle service-brake actuator
230 rear-axle modulator
232*a* first rear-axle service-brake actuator
232*b* second rear-axle service-brake actuator
232*c* third rear-axle service-brake actuator
232*d* fourth rear-axle service-brake actuator
240 parking brake unit
242*a* first spring-brake cylinder
242*b* second spring-brake cylinder
242*c* third spring-brake cylinder
242*d* fourth spring-brake cylinder
250 trailer control unit
251 trailer brake-pressure port
252 trailer signal line
253 trailer redundancy port
254 first shuttle valve
256 front-axle redundancy port
258 rear-axle redundancy port
260 second shuttle valve
262 foot brake pedal
264 spring accumulator port
300 first electronic control unit
302 second electronic control unit
400 central control unit
402 secondary brake module
A1 first axle
A2 second axle
B1 operating level
B2 first redundancy level
B3 second redundancy level
FD dual fault
FM multiple fault
FS power failure
FA exception error
pA working pressure
pBF foot brake pressure
pBHA rear-axle service-brake pressure
pBP parking brake pressure
pBT trailer brake pressure
pBVA front-axle service-brake pressure
pR1 first redundancy brake pressure
pR2 second redundancy brake pressure
pRS1 first redundancy control pressure
pRS2 second redundancy control pressure
pS1 first working control pressure
pS2 second working control pressure
pV reservoir pressure
pAV failure supply pressure
HA1 first rear axle
HA2 second rear axle
S1 first switching signal
S2 second switching signal
S3 third switching signal
S4 first pilot-control switching signal
S5 second pilot-control switching signal
S6 third pilot-control switching signal
S7 fourth pilot-control switching signal
SBA brake demand signal
SBT trailer brake signal
SBV front-axle brake signals
VA front axle

The invention claimed is:

1. An electropneumatic assembly for an electronically controllable pneumatic braking system for a vehicle, including a commercial vehicle;

the electropneumatic assembly comprising:

a first compressed-air reservoir;

a reservoir port for receiving a reservoir pressure from said first compressed-air reservoir;

a first redundancy brake-pressure port for providing a first redundancy brake pressure for at least one of a following: a first axle of the vehicle and a first axle of a trailer of the vehicle;

a failure supply port for providing a failure supply pressure limited with respect to and lower than the reservoir pressure; and, a failure safety-valve arrangement having a first failure brake valve realized as a monostable valve;

wherein:

said failure safety-valve arrangement is connected to said failure supply port and said first redundancy brake-pressure port and said first failure brake valve being switchable in an event of a fault in order to, based on the failure supply pressure, deliver the first redundancy brake pressure at said first redundancy brake-pressure port; or, said failure safety-valve arrangement is connected at least to a first redundancy control port and said first failure brake valve being switchable in the event of the fault in order to, based on the failure supply pressure, deliver at least a first redundancy control pressure at said first redundancy control port.

2. The electropneumatic assembly of claim 1, further comprising a second compressed-air reservoir; and, a spring-brake cylinder; and, wherein the failure supply pressure originates from said first compressed-air reservoir, said second compressed-air reservoir or said spring-brake cylinder.

3. The electropneumatic assembly of claim 1, wherein said first failure brake valve is a 3/2-way valve having a first failure brake-valve port receiving said failure supply pressure, a second failure brake-valve port delivering said first redundancy brake pressure or said first redundancy control pressure, and a third failure brake-valve port connected to a vent; and, in a non-activated switch position, the first failure brake-valve port is connected to said second failure brake-valve port and, in an activated switch position, said second failure brake-valve port is connected to said third failure brake-valve port.

4. The electropneumatic assembly of claim 1, further comprising:

a pressure limiter;

said pressure limiter being arranged upstream of said failure supply port or being part of said electropneumatic assembly for limiting the pressure received at said failure supply port.

5. The electropneumatic assembly of claim 1, wherein said failure safety-valve arrangement has an electromagnetic bistable valve pneumatically connected in series with said first failure brake valve.

6. The electropneumatic assembly of claim 5, wherein said electromagnetic bistable valve has a first bistable valve port receiving said failure supply pressure, a second bistable valve port connected to said first failure brake valve, and a third bistable valve port connected to a vent.

7. The electropneumatic assembly of claim 6, further comprising:

a working valve arrangement being connected to said reservoir port and receiving the reservoir pressure therefrom and being switchable to deliver said first redundancy brake pressure at said first redundancy brake-pressure port or to deliver a working pressure at a working port of said electropneumatic assembly; and, an electronic control unit for operating said working valve arrangement.

8. The electropneumatic assembly of claim 7, wherein said electronic control unit operates said first failure brake valve.

9. The electropneumatic assembly of claim 7, wherein said electronic control unit operates said bistable valve.

10. The electropneumatic assembly of claim 7, wherein said working valve arrangement has a first electromagnetic pilot unit and a first main valve unit; said first electromagnetic pilot unit is connected to said reservoir port and delivers a first working control pressure at said first main valve unit in dependence on first pilot-control switching signals of said electronic control unit; and, said first main valve unit is connected to said reservoir port and delivers a first working brake pressure in dependence on said first working control pressure received.

11. The electropneumatic assembly of claim 10, wherein said working valve arrangement has a second electromagnetic pilot unit and a second main valve unit; said second pilot unit is connected to said reservoir port and delivers a second working control pressure at said second main valve unit in dependence on second pilot-control switching signals of said electronic control unit; and, said second main valve unit is connected to said reservoir port and delivers a second working brake pressure in dependence on said second working control pressure received.

12. The electropneumatic assembly of claim 1, wherein the failure safety-valve arrangement has a second failure brake valve realized as a monostable valve pneumatically connected in series to said first failure brake valve.

13. The electropneumatic assembly of claim 12, wherein said second failure brake valve is operated by a further electronic control unit.

14. An electronically controllable pneumatic braking system for a vehicle including a commercial vehicle; the electronically controllable pneumatic brake system comprising:

a front axle modulator for providing a front-axle service-brake pressure at a first front-axle service-brake actuator and at a second front-axle service-brake actuator on a front axle of the vehicle;

a rear-axle modulator for providing a rear-axle service-brake pressure at least at a first rear-axle service-brake actuator and at a second rear-axle service-brake actuator on a rear axle of the vehicle; and, an electropneumatic assembly including:

a first compressed-air reservoir;

a reservoir port for receiving a reservoir pressure from said first compressed-air reservoir;

a first redundancy brake-pressure port for providing a first redundancy brake pressure for at least one of the following: a first axle of the vehicle and a first axle of a trailer of the vehicle;

a failure supply port for providing a failure supply pressure limited with respect to and lower than the reservoir pressure; and, a failure safety-valve arrangement having a first failure brake valve realized as a monostable valve;

wherein:

said failure safety-valve arrangement is connected to said failure supply port and said first redundancy brake-pressure port and said first failure brake valve being switchable in an event of a fault in order to, based on the failure supply pressure, deliver the first redundancy brake pressure at said first redundancy brake-pressure port; or, said failure safety-valve arrangement is connected at least to a first redundancy control port and said first failure brake valve being switchable in the event of the fault in order to, based on the failure supply pressure, deliver at least a first redundancy control pressure at said first redundancy control port;

wherein said first redundancy brake-pressure port is connected to at least one of the following: i) a front-axle redundancy port of the front-axle modulator to cause redundant delivery of the front-axle service-brake pressure; and, ii) to a rear-axle redundancy port of said rear-axle modulator to cause redundant delivery of the front.

15. The electronically controllable pneumatic braking system of claim 14, further comprising a central control unit providing front-axle brake signals at said front axle modulator to cause electronic delivery of said front-axle service-brake pressure and providing rear-axle brake signals at said rear-axle modulator to cause electronic delivery of said rear-axle service-brake pressure, wherein said central control unit operates said first failure brake valve.

16. The electronically controllable pneumatic braking system of claim 15, wherein the electropneumatic assembly is a secondary brake module of said electronically controllable pneumatic braking system and is configured to cause redundant delivery of said front-axle service-brake pressure and/or said rear-axle service-brake pressure in an event of said central control unit being prevented from electronically delivering the front-axle service-brake pressure and/or the rear-axle service-brake pressure.

17. The electronically controllable pneumatic braking system of claim 16, further comprising: a parking brake unit for providing a parking brake pressure at a first spring-brake cylinder and a second spring-brake cylinder on said rear axle of said vehicle, wherein said failure supply port is connected to said first spring-brake cylinder and/or said second spring-brake cylinder to receive the parking brake pressure or a pressure derived therefrom as failure supply pressure.

18. The electronically controllable pneumatic braking system of claim 17, wherein the electropneumatic assembly is integrated with the parking brake unit to form an assembly.

19. The electronically controllable pneumatic braking system of claim 14, further comprising: a trailer control unit for providing a trailer brake pressure at a trailer brake pressure port, wherein the first redundancy brake pressure port or a further redundancy brake pressure port of the electropneumatic assembly is connected to a trailer redundancy port of the trailer control unit to cause redundant delivery of the trailer brake pressure.

20. A method for controlling an electronically controllable pneumatic braking system which includes a front axle modulator for providing a front-axle service-brake pressure at a first front-axle service-brake actuator and at a second front-axle service-brake actuator on a front axle of the vehicle; a rear-axle modulator for providing a rear-axle service-brake pressure at least at a first rear-axle service-brake actuator and at a second rear-axle service-brake actuator on a rear axle of the vehicle; and, an electropneumatic assembly including: a first compressed-air reservoir; a reservoir port for receiving a reservoir pressure from said first compressed-air reservoir; a first redundancy brake-pressure port for providing a first redundancy brake pressure for at least one of the following: a first axle of the vehicle and a first axle of a trailer of the vehicle; a failure supply port for providing a failure supply pressure limited with respect to and lower than the reservoir pressure; and, a failure safety-valve arrangement having a first failure brake valve realized as a monostable valve;

wherein:

said failure safety-valve arrangement is connected to said failure supply port and said first redundancy brake-pressure port and said first failure brake valve being switchable in an event of a fault in order to, based on the failure supply pressure, deliver the first redundancy brake pressure at said first redundancy brake-pressure port; or, said failure safety-valve arrangement is connected at least to a first redundancy control port and said first failure brake valve being switchable in the event of the fault in order to, based on the failure supply pressure, deliver at least a first redundancy control pressure at said first redundancy control port;

wherein said first redundancy brake-pressure port is connected to at least one of the following: i) a front-axle redundancy port of the front-axle modulator to cause redundant delivery of the front-axle service-brake pressure; and, ii) to a rear-axle redundancy port of said rear-axle modulator to cause redundant delivery of the front-rear-axle service-brake pressure; the method comprising:

providing the reservoir pressure at the reservoir port of the electropneumatic assembly;

providing, at the failure supply port of the electropneumatic assembly, at least while the vehicle is moving, the failure supply pressure limited with respect to and lower than the reservoir pressure; and, locking out the failure supply pressure when the electronically controllable pneumatic braking system is in a fault-free state.

21. The method of claim 20, further comprising:

in the event of a fault of the electronically controllable braking system, the method includes the steps of:

de-energizing the first failure brake valve of the electropneumatic assembly; and, passing the failure supply pressure through the first failure brake valve to activate redundant braking of the vehicle via the front-axle service-brake actuators and/or the rear-axle service-brake actuators.

22. A vehicle including a commercial vehicle, the vehicle comprising:

a front axle;

a first rear axle and an electronically controllable pneumatic braking system;

the electronically controllable pneumatic braking system including:

a front axle modulator for providing a front-axle service-brake pressure at a first front-axle service-brake actuator and at a second front-axle service-brake actuator on a front axle of the vehicle;

a rear-axle modulator for providing a rear-axle service-brake pressure at least at a first rear-axle service-brake actuator and at a second rear-axle service-brake actuator on a rear axle of the vehicle; and, an electropneumatic assembly including:

a first compressed-air reservoir;

a reservoir port for receiving a reservoir pressure from said first compressed-air reservoir;

a first redundancy brake-pressure port for providing a first redundancy brake pressure for at least one of the following: a first axle of the vehicle and a first axle of a trailer of the vehicle;

a failure supply port for providing a failure supply pressure limited with respect to and lower than the reservoir pressure; and, a failure safety-valve arrangement having a first failure brake valve realized as a monostable valve;

wherein:

said failure safety-valve arrangement is connected to said failure supply port and said first redundancy brake-pressure port and said first failure brake valve being switchable in an event of a fault in order to, based on the failure supply pressure, deliver the first redundancy brake pressure at said first redundancy brake-pressure port; or, said failure safety-valve arrangement is connected at least to a first redundancy control port and said first failure brake valve being switchable in the event of the fault in order to, based on the failure supply pressure, deliver at least a first redundancy control pressure at said first redundancy control port;

wherein said first redundancy brake-pressure port is connected to at least one of the following: i) a front-axle redundancy port of the front-axle modulator to cause redundant delivery of the front-axle service-brake pressure; and, ii) to a rear-axle redundancy port of said rear-axle modulator to cause redundant delivery of the rear-axle service-brake pressure;

said electronically controllable pneumatic braking system being configured to:

provide the reservoir pressure at said reservoir port of said electropneumatic assembly;

providing, at said failure supply port of the electropneumatic assembly, at least while the vehicle is moving, the failure supply pressure limited with respect to and lower than the reservoir pressure; and, lock out the failure supply pressure when the electronically controllable pneumatic braking system is in a fault-free state.

* * * * *